US010573041B2

(12) United States Patent
Yamaji et al.

(10) Patent No.: US 10,573,041 B2
(45) Date of Patent: Feb. 25, 2020

(54) REAR IMAGE CANDIDATE DETERMINATION DEVICE, REAR IMAGE CANDIDATE DETERMINATION METHOD, AND REAR IMAGE CANDIDATE DETERMINATION PROGRAM

(71) Applicant: FUJIFILM Corporation, Tokyo (JP)

(72) Inventors: Kei Yamaji, Tokyo (JP); Kenichi Sonoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 115 days.

(21) Appl. No.: 15/678,322

(22) Filed: Aug. 16, 2017

(65) Prior Publication Data
US 2018/0082455 A1 Mar. 22, 2018

(30) Foreign Application Priority Data
Sep. 16, 2016 (JP) .................. 2016-182019

(51) Int. Cl.
*G06T 11/60* (2006.01)
*G06K 9/00* (2006.01)
*G06K 9/46* (2006.01)

(52) U.S. Cl.
CPC .......... *G06T 11/60* (2013.01); *G06K 9/00362* (2013.01); *G06K 9/00664* (2013.01); *G06K 9/00684* (2013.01); *G06K 9/4652* (2013.01); *G06T 2200/32* (2013.01)

(58) Field of Classification Search
CPC .. G06T 7/00; G06T 11/60; G06K 9/46; G06K 9/00664; G06K 9/00362; G06K 9/00684; G06F 3/0483; G06F 17/212; G06F 17/211
See application file for complete search history.

(56) References Cited

U.S. PATENT DOCUMENTS

| | | | |
|---|---|---|---|
| 2005/0134946 A1* | 6/2005 | Tsue ........................ | G06T 11/60 358/537 |
| 2009/0316989 A1 | 12/2009 | Barbieri et al. | |
| 2011/0157227 A1* | 6/2011 | Ptucha .................... | H04N 5/232 345/638 |
| 2011/0242336 A1* | 10/2011 | Yamaji .................... | H04N 1/387 348/207.2 |
| 2012/0020648 A1* | 1/2012 | Yamaji .................. | G11B 27/034 386/278 |

(Continued)

FOREIGN PATENT DOCUMENTS

| | | |
|---|---|---|
| JP | 2010-503101 A | 1/2010 |
| JP | 2011-172103 A | 9/2011 |

(Continued)

*Primary Examiner* — Chante E Harrison
(74) *Attorney, Agent, or Firm* — Studebaker & Brackett PC

(57) ABSTRACT

The first rear image candidate determination unit determines a first rear image candidate from among first object determination images on the basis of a first evaluation value calculated by the first evaluation value calculation unit and a first evaluation criterion stored in the first evaluation criterion storage unit. For example, the first rear image candidate determination unit determines a first object determination image (which may be one or a plurality of object determination images) in which a first evaluation value equal to or greater than a first evaluation criterion has been calculated, to be the first rear image candidate.

18 Claims, 16 Drawing Sheets

(56) References Cited

U.S. PATENT DOCUMENTS

| | | | | |
|---|---|---|---|---|
| 2012/0321217 A1* | 12/2012 | Cok | ........................ | G06T 11/60 |
| | | | | 382/284 |
| 2016/0093083 A1* | 3/2016 | Chen | ....................... | G06T 11/60 |
| | | | | 382/224 |
| 2018/0164964 A1* | 6/2018 | Hori | ........................ | G06T 11/60 |

FOREIGN PATENT DOCUMENTS

| JP | 2013-239006 A | 11/2013 |
|---|---|---|
| JP | 2015-138428 A | 7/2015 |

* cited by examiner understand# REAR IMAGE CANDIDATE DETERMINATION DEVICE, REAR IMAGE CANDIDATE DETERMINATION METHOD, AND REAR IMAGE CANDIDATE DETERMINATION PROGRAM

CROSS-REFERENCE TO RELATED APPLICATIONS

The present application claims priority under 35 U.S.C. § 119 to Japanese Patent Application No. 2016-182019, filed on Sep. 16, 2016. Each of the above application(s) is hereby expressly incorporated by reference, in its entirety, into the present application.

BACKGROUND OF THE INVENTION

1. Field of the Invention

The present invention relates to a rear image candidate determination device, a rear image candidate determination method, and a non-transitory computer readable recording medium storing a rear image candidate determination program, and more particularly, to a rear image candidate determination device, a rear image candidate determination method, and a non-transitory computer readable recording medium storing a rear image candidate determination program for a photo book.

2. Description of the Related Art

A photo book is a photo album that is completed by arranging a plurality of images captured by a digital camera, a smartphone, or the like in a template or the like that defines a layout of each image in each page. When a photo book is created, a user can select, for example, a desired template from among a plurality of templates of a layout in which positions at which images can be arranged have been determined in advance, and can freely determine the number of pages of the photo book, images to be included in each page, an arrangement of images in each page, or the like.

As a method of creating a photo book in the related art, a method of classifying a plurality of images into groups in consideration of continuity or relevance of images, for example, on the basis of an imaging time or the like, and automatically laying out the images included in each group in respective corresponding pages is known.

Alternatively, there is a technology for performing analysis such as object extraction on an image or a technology for determining an arrangement of images in a photo book on the basis of a result of object analysis as related art.

For example, in JP2013-239006A, a pattern (invisibility information) such as a stripe or a checkered pattern is formed for a background or the like, and an object such as a person, an object, or character information drawn or pasted on a background is extracted using the invisibility information.

In JP2010-503101A, a foreground image is appropriately laid out in a background image in creating a collage of images. That is, foreground images are laid out not to overlap each other and not to block a background region of interest.

JP2011-172103A describes that a main subject is determined from a plurality of consecutively captured images, a frame in which the main subject is small and a space (free space) other than the main subject is large is selected as a mount, a frame of an image of a person to be superimposed on the mount is selected, and a combined image obtained by combining the selected frame with the mount is created.

In JP2015-138428A, in order to overlap additional information (a label of a character string, an image, or the like) regarding an object on a captured image in which the object is reflected in an easy-to-see manner, an evaluation value regarding a sky region in which sky is reflected is calculated as an evaluation value indicating visibility of the additional information.

SUMMARY OF THE INVENTION

As illustrated in FIGS. 16 and 17, when a layout in which images overlap is adopted, a photo book with higher design characteristics can be created. In this case, it is important which image is selected as an image laid out on the rear side of a template, that is, a rear image. For example, if an arrangement in which the intention of a combination of the rear image and the front image is not well understood is made since the relationship between the rear image and the front image is low as illustrated in FIG. 18, a degree of satisfaction of the photo book by a user is lowered.

In JP2013-239006A and JP2010-503101A, a determination as to which image is selected as a rear image is not performed.

Further, in JP2011-172103A, it cannot be determined whether or not images having different main subjects are appropriate as background images.

Further, in JP2015-138428A, an evaluation value indicating visibility of additional information is merely calculated, and an image suitable for a rear image of a photo book is not determined.

An object of the present invention is to provide a rear image candidate determination device, a rear image candidate determination method, and a non-transitory computer readable recording medium storing a rear image candidate determination program that determine an image optimal as a rear image of a photo book according to content of the image.

A first aspect of the present invention provides a rear image candidate determination device, comprising: an image reception unit that receives a plurality of images; a first object determination unit that determines whether or not each of the plurality of images includes a first object; a first evaluation value calculation unit that calculates, for a first object determination image that is an image determined to include the first object by the first object determination unit, a first evaluation value that is an evaluation value of the first object determination image; a first evaluation criterion storage unit that stores a first evaluation criterion for evaluating the first evaluation value; and a first rear image candidate determination unit that determines a first rear image candidate from among the first object determination images on the basis of the first evaluation value calculated by the first evaluation value calculation unit and the first evaluation criterion stored in the first evaluation criterion storage unit.

According to this aspect, the first rear image candidate is determined from the first object determination images on the basis of the first evaluation value of the first object determination image and the first evaluation criterion. Thus, an appropriate image including the first object and satisfying the first evaluation criterion is determined as a rear image candidate.

A second aspect of the present invention provides a rear image candidate determination device further comprising: a theme setting unit that sets a theme corresponding to the plurality of images, wherein the first object determination unit determines whether or not each of the plurality of images includes the first object corresponding to the theme set by the theme setting unit.

In a third aspect of the present invention, the first object determination unit determines whether or not each of the plurality of images includes the first object on the basis of hue, lightness, and saturation of each of the plurality of images.

According to this aspect, it is possible to determine whether or not each of the plurality of images includes a first object on the basis of hue, lightness, and saturation of each of the plurality of images.

In a fourth aspect of the present invention, the first object includes at least one of a mountain, the sea, or the sky, and the first object determination unit determines whether or not each of the plurality of images includes the first object on the basis of hue, lightness, and saturation of a partial region of an image corresponding to the at least one of a mountain, the sea, or the sky.

According to this aspect, it is possible to determine whether or not each of the plurality of images includes a first object on the basis of hue, lightness, and saturation of a partial region of an image corresponding to the at least one of a mountain, the sea, or the sky.

In a fifth aspect of the present invention, the first object includes only a wedding bride and groom, and the first object determination unit determines whether or not each of the plurality of images includes the first object on the basis of hue, lightness, and saturation of a partial region of an image corresponding to the wedding bride and groom.

According to this aspect, it is possible to determine whether or not each of the plurality of images includes a first object on the basis of hue, lightness, and saturation of a partial region of an image corresponding to the wedding bride and groom.

In a sixth aspect of the present invention, the first object includes children with a smiling face, and the first object determination unit determines whether or not each of the plurality of images includes the first object on the basis of hue, lightness, and saturation of a partial region of an image corresponding to the children with a smiling face.

According to this aspect, it is possible to determine whether or not each of the plurality of images includes a first object on the basis of hue, lightness, and saturation of a partial region of an image corresponding to the children with a smiling face.

In a seventh aspect of the present invention, the first evaluation value is a value regarding image quality of the first object determination image, and the first evaluation criterion is a threshold value regarding image quality of the first object determination image.

In a eighth aspect of the present invention, the first evaluation value includes at least one of a degree of blurriness, shake, or brightness of the first object determination image, and the first evaluation criterion includes a threshold of at least one of a degree of blurriness, shake, or brightness of the first object determination image.

An ninth aspect of the present invention provides a rear image candidate determination device further comprising: a first rear image candidate layout unit that lays out the first rear image candidates determined by the first rear image candidate determination unit in a rear image layout region of a first rear image template, the first rear image template including the rear image layout region in which the rear image is laid out and a front image layout region in which one or a plurality of front images are laid out.

According to this aspect, it is possible to lay out the first rear image candidates determined by the first rear image candidate determination unit in a rear image layout region of a first rear image template, the first rear image template including the rear image layout region in which the rear image is laid out and a front image layout region in which one or a plurality of front images are laid out.

A tenth aspect of the present invention provides a rear image candidate determination device further comprising: a person image determination unit that determines whether or not each of the plurality of images is a person image including a person; a landscape image determination unit that determines whether or not each of the plurality of images is a landscape image including a landscape; a person-landscape ratio storage unit that stores a ratio between the person image and the landscape image; and a first front image layout unit that lays out the person image and the landscape image in the front image layout region of the first rear image template according to the ratio between the person image and the landscape image.

According to this aspect, it is possible to lay out the person image and the landscape image in the front image layout region of the first rear image template according to the ratio between the person image and the landscape image. The ratio is a ratio of the number or a ratio of an area.

A eleventh aspect of the present invention provides a rear image candidate determination device further comprising: a display unit that distinguishably displays the front image layout region, an exclusion region obtained by excluding the front image layout region in the rear image layout region, and a list display region for displaying a list of at least some of a plurality of images; and an exclusion region selection unit that receives a selection of the exclusion region, wherein the display unit displays, in the list display region, the first rear image candidates other than the first rear image candidates laid out in the rear image layout region among the images indicating the first rear image candidates determined by the first rear image candidate determination unit according to the exclusion region selection unit receiving a selection of the exclusion region.

According to this aspect, it is possible to display, in a list display region, the first rear image candidates other than the first rear image candidates laid out in the rear image layout region among the images indicating the first rear image candidates determined by the first rear image candidate determination unit according to reception of selection of the exclusion region.

An twelfth aspect of the present invention provides a rear image candidate determination device further comprising: a front image layout region selection unit that receives a selection of the front image layout region, wherein the display unit displays at least some of the plurality of images in the list display region according to the front image layout region selection unit receiving the selection of the front image layout region.

According to this aspect, it is possible to display at least some of the plurality of images in the list display region according to the front image layout region selection unit receiving the selection of the front image layout region.

According to a thirteenth aspect of the present invention, the rear image candidate determination device further comprises: an image selection unit that receives a selection of a desired image from among the plurality of images; a display unit that displays candidates of the first rear image template according to the image selection unit receiving the selection of the first rear image candidate; and a first rear image template selection unit that receives a selection of the desired first rear image template from among the candidates of the first rear image template, wherein the display unit displays a combined image obtained by combining the first rear image candidate laid out in the rear image layout region in the first rear image template of which a selection is received by the first rear image template selection unit, and the person image and the landscape image laid out in the front image layout region in the first rear image template of which the selection is received by the first rear image template selection unit.

According to this aspect, it is possible to display a combined image obtained by combining the first rear image candidate laid out in the rear image layout region in the first rear image template of which a selection is received by the first rear image template selection unit, and the person image and the landscape image laid out in the front image layout region in the first rear image template of which the selection is received by the first rear image template selection unit.

A fourteenth aspect of the present invention provides a rear image candidate determination device further comprising: a second object determination unit that determines whether or not each of the plurality of images includes a second object; and a second rear image candidate determination unit that determines second rear image candidates from second object determination images that are images determined not to include the second object by the second object determination unit.

In a fifteenth aspect of the present invention, the second object includes a person, and the second object determination unit determines whether or not each of the plurality of images includes the second object through person detection.

A sixteenth aspect of the present invention provides a rear image candidate determination device, further comprising: a second evaluation value calculation unit that calculates a second evaluation value that is an evaluation value of the second object determination image for the second object determination image; and a second evaluation criterion storage unit that stores a second evaluation criterion for evaluating the second evaluation value, wherein the second rear image candidate determination unit determines the second rear image candidates from among the second object determination images on the basis of the second evaluation value calculated by the second evaluation value calculation unit and the second evaluation criterion stored in the second evaluation criterion storage unit.

According to this aspect, the second rear image candidate is determined from among the second object determination images on the basis of the second evaluation value of the second object determination image and the second evaluation criterion. Thus, an appropriate image not including the second object and satisfying the second evaluation criterion is determined as the front image candidate.

In a seventeenth aspect of the present invention, the second evaluation value is a value regarding image quality of the second object determination image, and the second evaluation criterion is a threshold value regarding the image quality of the second object determination image.

A eighteenth aspect of the present invention provides a rear image candidate determination device further comprising: a second rear image candidate layout unit that lays out the second rear image candidates determined by the second rear image candidate determination unit in a rear image layout region of a second rear image template, the second rear image template including the rear image layout region in which the rear image is laid out as a background, and a front image layout region in which one or a plurality of front images are laid out as a foreground.

An nineteenth aspect of the present invention provides a rear image candidate determination device, further comprising: a person image determination unit that determines whether or not a front image candidate that is an image determined to include the second object by the second object determination unit is a person front image including a person; a landscape image determination unit that determines whether or not a front image candidate that is an image determined to include the second object by the second object determination unit is a landscape front image including a landscape; a person-landscape ratio storage unit that stores a ratio of a person front image and a landscape front image to be laid in the front image layout region of the second rear image template; and a second front image layout unit that lays out the person front image and the landscape front image in the front image layout region of the second rear image template according to the ratio of the person front image and the landscape front image stored in the person-landscape ratio storage unit.

A twentieth aspect of the present invention provides a rear image candidate determination method, comprising steps of: receiving a plurality of images; determining whether or not each of the plurality of images includes a first object; calculating, for a first object determination image that is an image determined to include the first object, a first evaluation value that is an evaluation value of the first object determination image; storing a first evaluation criterion for evaluating the first evaluation value; and determining a first rear image candidate from among the first object determination images on the basis of the first evaluation value and the first evaluation criterion.

A twenty-first aspect of the present invention provides a non-transitory computer readable recording medium storing a rear image candidate determination program for causing a computer to execute the rear image candidate determination method according to the twentieth aspect.

According to the present invention, the first rear image candidate is determined from the first object determination images on the basis of the first evaluation value of the first object determination image and the first evaluation criterion. Thus, an appropriate image including the first object and satisfying the first evaluation criterion is determined as a rear image candidate. Therefore, it is possible to determine an image optimal as a rear image of a photo book according to content of the image.

DESCRIPTION OF THE PREFERRED EMBODIMENTS

Figure 1:
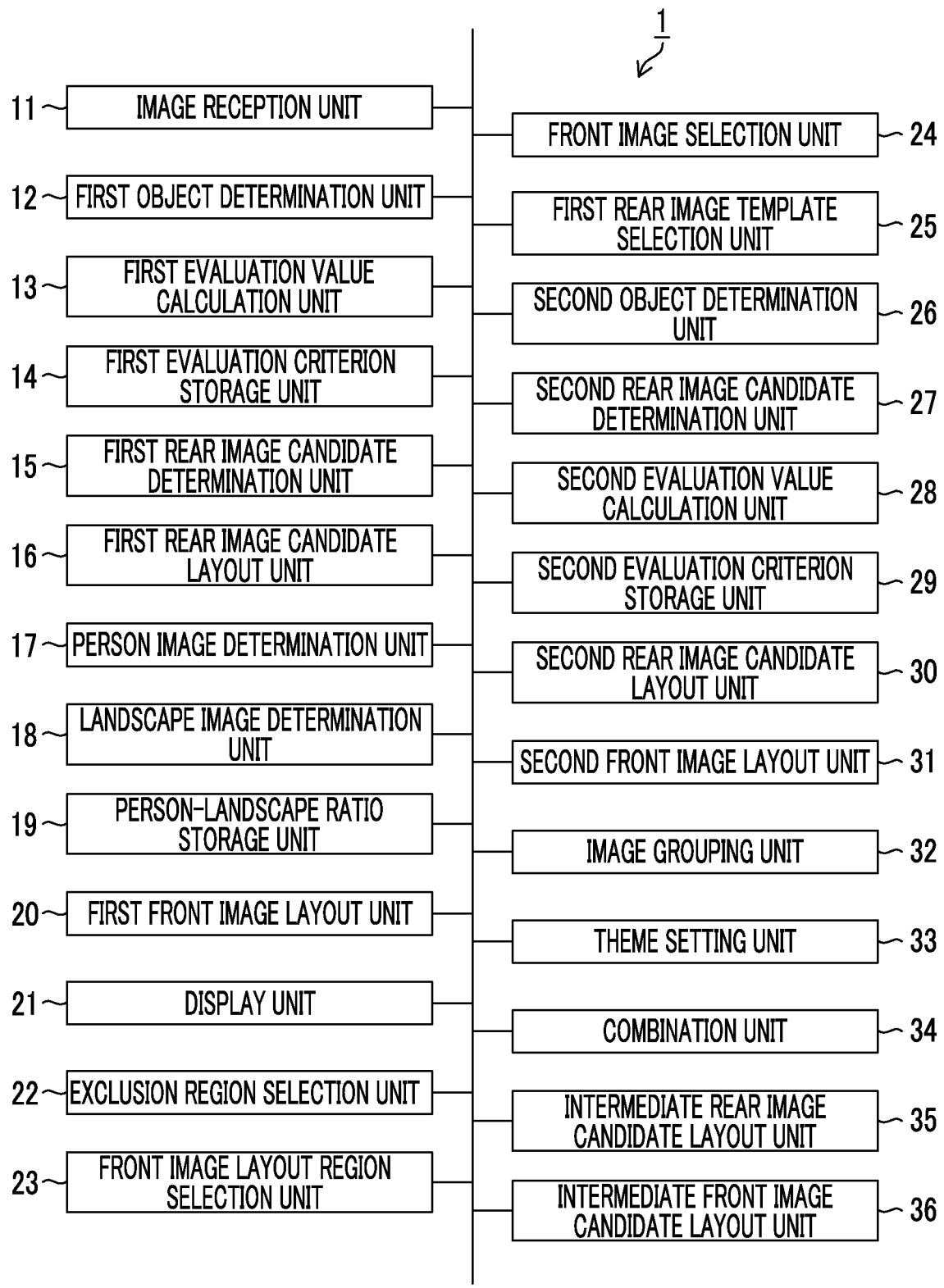
FIG. 1 is a block diagram of a rear image candidate determination device.

Meanings of the following terms used herein are as follows.

A photo book is a photo album in which one or more images arbitrarily selected from a plurality of images captured by a digital camera, a smartphone, or the like are laid out in an arbitrary layout on each of one or more pages, and the images laid out are combined. The page includes one of left or right pages and any of double-sided pages including both of the left and right pages. Further, a combined image obtained by adding various decorations or processes to images that have been laid out is included in the photo book.

A template is data that defines a layout including a position and a size of each of one or a plurality of images laid out in each of one or more pages in a photo book. The position and the size of the image are defined by the region. The template also includes one or more (preferably one) rear image layout regions covering an entire region of a specific page in the template, and one or more front image layout regions covering a partial region of the specific page. The front image layout regions may partially overlap, the rear image layout regions may partially overlap or the rear image layout region and the front image layout region may partially overlap. In this case, the template further defines a priority between overlapping front image layout regions and a priority between the rear image layout region and the front image layout region that overlap. That is, the priority is ordering as to which one is visible and which one is hidden in the portion where the two overlap. The front image layout region has a higher priority than the rear image layout region, and in a portion in which the regions overlap, the front image is seen, whereas the rear image is hidden behind the front image and is not seen. The template may include a layout of an image or a decoration of an image according to the theme of the photo book, such as a wedding ceremony, travel, or children. Further, the theme of the photo book may be freely set by the user.

The frame is an individual region that defines a layout including positions and sizes in which individual images are laid out in a template. The rear image layout region and the front image layout region are examples of frames. In a case where frames overlap each other, a priority of each frame is defined in the template.

The rear image candidate is a candidate of an image to be arranged in a frame corresponding to the rear image layout region.

The front image candidate is a candidate of an image to be arranged in a frame corresponding to the front image layout region.

The rear image is an image arranged in a frame corresponding to the rear image layout region. Which image becomes the rear image will be described below.

The front image is an image arranged in a frame corresponding to the front image layout region. Which image becomes the front image will be described below.

The combined image is an image in which the rear image and the front image are combined according to the layout of the template.

The first background image template is a template that defines a layout in which an occupying area of the rear image layout region is larger than an occupying area of the front image layout region in a specific page. The first rear image template may be stored in a computer-readable non-transitory tangible medium such as a flash memory as a predetermined template or may be a template in which the rear image layout region and the front image layout region are arbitrarily set by the user. In a case where the template arbitrarily set by the user is a first rear image template, a program for determining, with a processor, whether or not the template arbitrarily set by the user defines a layout in which an occupying area of the rear image layout region is larger than an occupying area of the front image layout region in a specific page may be stored in the above medium and may be executed as appropriate.

The second rear image template is a template that defines a layout in which an occupying area of the front image layout region is larger than an occupying area of the rear image layout region in a specific page. The second rear image template may be stored in a medium such as a flash memory as a predetermined template or may be a template arbitrarily set by the user. In a case where the template arbitrarily set by the user is the second rear image template, a program for determining, with a processor, whether or not the template arbitrarily set by the user defines a layout in which an occupying area of the front image layout region is larger than an occupying area of the rear image layout region in a specific page may be stored in the above medium and may be executed as appropriate.

The intermediate template is a template that defines a layout in which proportions of areas occupied by the rear image layout region and the front image layout region in a specific page are the same.

The normal template is a template that does not correspond to any of the first rear image template, the second rear image template, and the intermediate template.

The list display means displaying representative images (thumbnail images, icons, or the like) corresponding to a plurality of images or each of the plurality of images side by side.

The exclusion region is a region obtained by excluding the front image layout region from the rear image layout region.

<First Embodiment>

FIG. 1 is a block diagram of a rear image candidate determination device 1 which is an embodiment of a rear image candidate determination device of the present invention. The rear image candidate determination device 1 includes an image reception unit 11, a first object determination unit 12, a first evaluation value calculation unit 13, a first evaluation criterion storage unit 14, a first rear image candidate determination unit 15, a first rear image candidate layout unit 16, a person image determination unit 17, a landscape image determination unit 18, a person-landscape ratio storage unit 19, a first front image layout unit 20, a display unit 21, an exclusion region selection unit 22, a front image layout region selection unit 23, an front image selection unit 24, a first rear image template selection unit 25, a second object determination unit 26, a second rear image candidate determination unit 27, a second evaluation value calculation unit 28, a second evaluation criterion storage unit 29, a second rear image candidate layout unit 30, a second front image layout unit 31, an image grouping unit 32, a theme setting unit 33, a combination unit 34, an intermediate rear image candidate layout unit 35, and an intermediate front image candidate layout unit 36. The rear image candidate determination device 1 can be configured with a known personal computer, and each unit of the rear image candidate determination device 1 can be configured with a device constituting a known computer (including either a desktop type computer or a tablet type computer), various peripheral devices (a keyboard, a touch panel, a mouse, a printer, a display, and the like) used in a known computer, or a device in which some or all of the peripheral devices are incorporated in a computer.

For example, the first object determination unit 12, the first evaluation value calculation unit 13, the first evaluation criterion storage unit 14, the first rear image candidate determination unit 15, the first rear image candidate layout unit 16, the person image determination unit 17, the landscape image determination unit 18, the person-landscape ratio storage unit 19, the first front image layout unit 20, the second object determination unit 26, the second rear image candidate determination unit 27, the second evaluation value calculation unit 28, the second evaluation criterion storage unit 29, the second rear image candidate layout unit 30, the second front image layout unit 31, the image grouping unit 32, the theme setting unit 33, the combination unit 34, the intermediate rear image candidate layout unit 35, and the intermediate front image candidate layout unit 36 are configured with a processor. For example, each of these units may include a central processing unit (CPU), a random access memory (RAM), a read only memory (ROM), a hard disk, and a bus connecting them built in a personal computer. Alternatively, each of these units may include, for example, a one-chip microcomputer in which a CPU, a RAM, and a ROM are integrated.

Further, the image reception unit 11 may include a universal serial bus (USB) port, a wired local area network (LAN) adapter, a wireless LAN adapter, a memory card reader, or the like. Further, the display unit 21 includes a display, a driver, and the like, and displays various kinds of information.

Further, the exclusion region selection unit 22, the front image layout region selection unit 23, the front image selection unit 24, and the first rear image template selection unit 25 may include various user interfaces such as a keyboard, a mouse, or a touch panel.

The image reception unit 11 is a device that receives a plurality of images captured by a digital camera, a smartphone, or the like through wired communication, wireless communication, or readout of a recording medium. The image received by the image reception unit 11 is recorded according to a format of various image files such as a Joint Photographic Experts Group (JPEG) file. In addition to an image itself, supplementary information such as imaging date is received with the image itself. The image and the supplementary information received by the image reception unit 11 are stored in various storage media such as a hard disk unit (not illustrated).

The first object determination unit 12 determines whether or not each of the plurality of images received by the image reception unit 11 includes a first object.

The first object may include at least one of a mountain, the sea, or the sky. The first object determination unit 12 can determine whether or not each of the plurality of images includes the first object on the basis of hue, lightness, and saturation of a partial region of an image corresponding to at least one of the mountain, the sea, or the sky. This can be realized by known landscape analysis such as a landscape scene determination, image annotation, or machine learning. In a case where the theme setting unit 33 sets "travel" in a theme of the photo book according to an arbitrary instruction from the user, the first object determination unit 12 may determine whether or not at least one of the mountain, the sea, or the sky is included.

The first object may include a wedding bride and groom. Alternatively, the first object may be only the wedding bride and groom. The first object determination unit 12 can determine whether or not each of the plurality of images includes the first object on the basis of hue, lightness, and saturation of a partial region of an image corresponding to the wedding bride and groom. This can be realized by known subject analysis such as wedding scene detection, image annotation, or machine learning. In a case where the theme setting unit 33 sets a "marriage" in the theme of the photo book, the first object determination unit 12 may determine whether or not each of the plurality of images includes only the bride and groom.

The first object may include children. Alternatively, the first object may include a child of which a facial expression is smile. The first object determination unit 12 can determine whether or not each of the plurality of images includes the first object on the basis of hue, lightness, and saturation of a partial region of an image corresponding to the smile children. This can be realized by known subject analysis such as smile detection or image annotation. In a case where the theme setting unit 33 sets "children" to the theme of the photo book, the first object determination unit 12 may determine whether or not each of the plurality of images includes the smile children.

The first evaluation value calculation unit 13 calculates, for a first object determination image that is an image determined to include the first object by the first object determination unit 12, a first evaluation value that is an evaluation value of the first object determination image. The first evaluation value of the first object determination image is a value regarding image quality including at least one of a degree of blurriness, shake, or brightness of the first object determination image. That is, the first evaluation value of the first object determination image is not limited to a one-dimensional value, but may be a two or more-dimensional value. For example, the first evaluation value may be a combination of at least one of a degree of blurriness, shake, or brightness, and a degree of smile.

The first evaluation criterion storage unit 14 stores a first evaluation criterion for evaluating the first evaluation value. The first evaluation criterion storage unit 14 may include a ROM or a flash memory. The first evaluation criterion is a threshold value regarding image quality of the first object determination image. The first evaluation criterion includes a threshold value of at least one of the degree of blurriness, shake, or brightness of the first object determination image. This threshold value may be updated automatically or manually as necessary.

The first rear image candidate determination unit 15 determines a first rear image candidate from among the first object determination images on the basis of the first evaluation value calculated by the first evaluation value calculation unit 13 and the first evaluation criterion stored in the first evaluation criterion storage unit 14.

The first rear image candidate layout unit 16 lays out the first rear image candidates determined by the first rear image candidate determination unit 15 in the rear image layout region of the first rear image template, the first rear image template includes the rear image layout region in which the rear image is laid out and the front image layout region in which one or a plurality of front images are laid out.

The person image determination unit 17 determines whether or not each of the plurality of images is a person image including a person. This can be realized by known subject analysis such as face detection, image annotation, or machine learning.

The landscape image determination unit 18 is a device that determines whether or not each of the plurality of images is a landscape image including a landscape. This can be realized by known subject analysis such as scene determination, image annotation, or machine learning.

The person-landscape ratio storage unit 19 stores a ratio of the number of layouts of the person image and the landscape image in each page of each template for each theme. For example, the person-landscape ratio storage unit 19 stores a ratio of the person image and the landscape image in the second page of the first rear image template of the theme "travel"=2:2. Alternatively, the person-landscape ratio storage unit 19 stores a ratio of the person image and the landscape image in the second page of the second rear image template of the theme "travel"=4:1.

The first front image layout unit 20 lays out a person image and a landscape image in the front image layout region of the first rear image template according to the ratio of the number of layouts of the person image and the landscape image corresponding to the theme set by the theme setting unit 33 to be described below.

The display unit 21 is a device that distinguishably displays the front image layout region, the exclusion region obtained by excluding the front image layout region in the rear image layout region, and a list display region for displaying a list of at least some of a plurality of images. Further, the distinguishable display of the front image layout region, the exclusion region, and the list display region includes various displays capable of visually distinguishing the regions, such as a display of the regions in different regions of the same window, a color-coding display, a highlighting display, and a display of the regions in another window. The exclusion region selection unit 22 is a device that receives a selection of the exclusion region.

Here, the display unit 21 displays, in a list display region, the first rear image candidates other than the first rear image candidates laid out in the rear image layout region among the images indicating the first rear image candidates determined by the first rear image candidate determination unit 15 according to the exclusion region selection unit 22 receiving a selection of the exclusion region.

The front image layout region selection unit 23 is a device that receives a selection of the front image layout region. Here, the display unit 21 displays at least some of the plurality of images in the list display region according to the front image layout region selection unit 23 receiving the selection of the front image layout region.

The front image selection unit 24 is a device that receives a selection of a desired image from among the plurality of images received by the image reception unit 11. The front image selection unit 24 may be an image selection unit that receives a selection of a desired rear image from among the plurality of images.

The first rear image template selection unit 25 is a device that receives a selection of a desired first rear image template from among the candidates of the first rear image template. Here, the display unit 21 displays a combined image obtained by combining the first rear image candidate laid out in the rear image layout region in the first rear image template of which the selection is received by the first rear image template selection unit 25 and the person image and the landscape image laid out in the front image layout region in the first rear image template of which the selection is received by the first rear image template selection unit 25.

The second object determination unit 26 determines whether or not each of the plurality of images received by the image reception unit 11 includes the second object.

The second rear image candidate determination unit 27 determines the second rear image candidates from the second object determination images that are images determined not to include the second object by the second object determination unit 26.

The second evaluation value calculation unit 28 calculates a second evaluation value that is an evaluation value of the second object determination image for the second object determination image.

The second evaluation criterion storage unit 29 stores the second evaluation criterion for evaluating the second evaluation value.

Here, the second rear image candidate determination unit 27 determines second rear image candidates from among the second object determination images on the basis of the second evaluation value calculated by the second evaluation value calculation unit 28 and the second evaluation criterion stored in the second evaluation criterion storage unit 29.

The second object includes a person. Here, the second object determination unit 26 determines whether or not each of the plurality of images includes the second object through human detection. This can be realized by known subject analysis such as face detection, image annotation, or machine learning.

The second evaluation value calculated by the second evaluation value calculation unit 28 is a value regarding image quality of the second object determination image, and the second evaluation criterion stored in the second evaluation criterion storage unit 29 is a threshold value regarding the image quality of the second object determination image. The second evaluation criterion includes a threshold value of at least one of a degree of blurriness, shake, or brightness of the second object determination image.

The second rear image candidate layout unit 30 lays out the second rear image candidates determined by the second rear image candidate determination unit 27 in a rear image layout region of the second rear image template. The second rear image template includes the rear image layout region in which the rear image is laid out as a background, and a front image layout region in which one or a plurality of front images are laid out as a foreground.

The person image determination unit 17 can determine whether or not a front image candidate that is an image determined to include the second object by the second object determination unit 26 is a person front image including a person.

The landscape image determination unit 18 can determine whether or not a front image candidate that is an image determined to include the second object by the second object determination unit 26 is a landscape front image including a landscape.

The person-landscape ratio storage unit 19 can store the ratio of the person front image and the landscape front image to be laid in the front image layout region of the second rear image template.

The second front image layout unit 31 lays out the person front image and the landscape front image in the front image layout region of the second rear image template according to the ratio of the person front image and the landscape front image stored in the person-landscape ratio storage unit 19.

Figure 2:
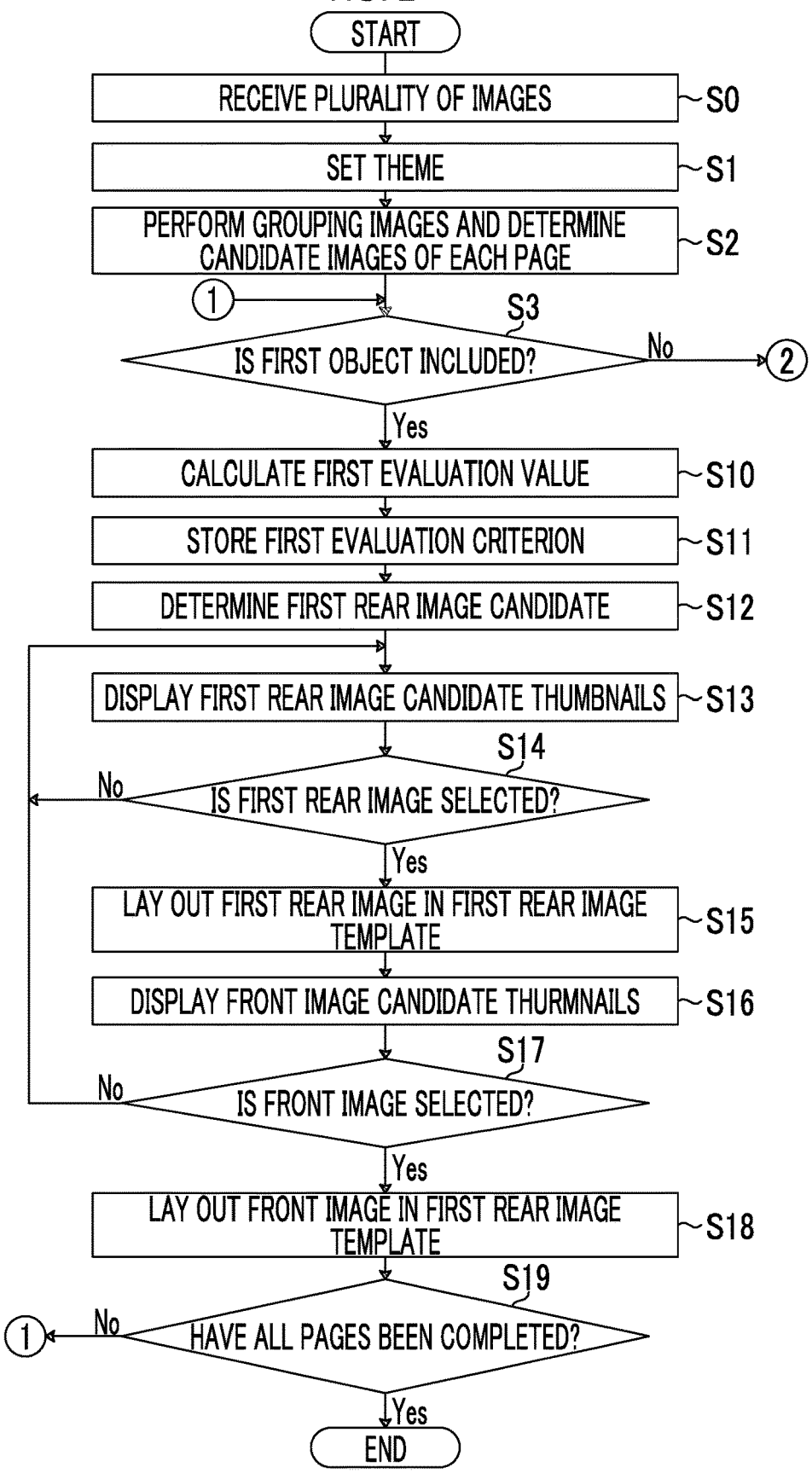
FIG. 2 is a flowchart of a first rear image template layout process.
Figure 3:
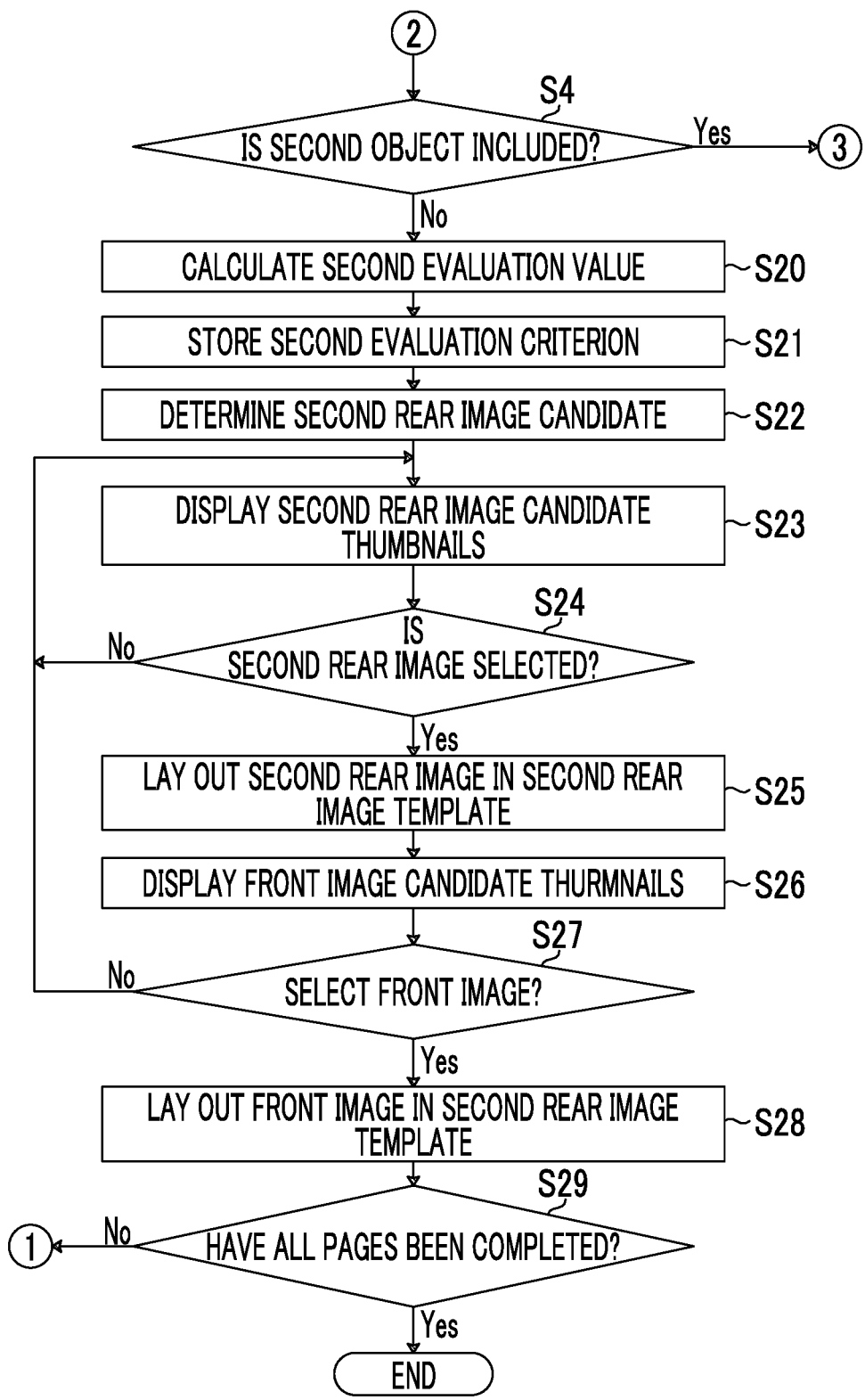
FIG. 3 is a flowchart of a second rear image template layout process
Figure 4:
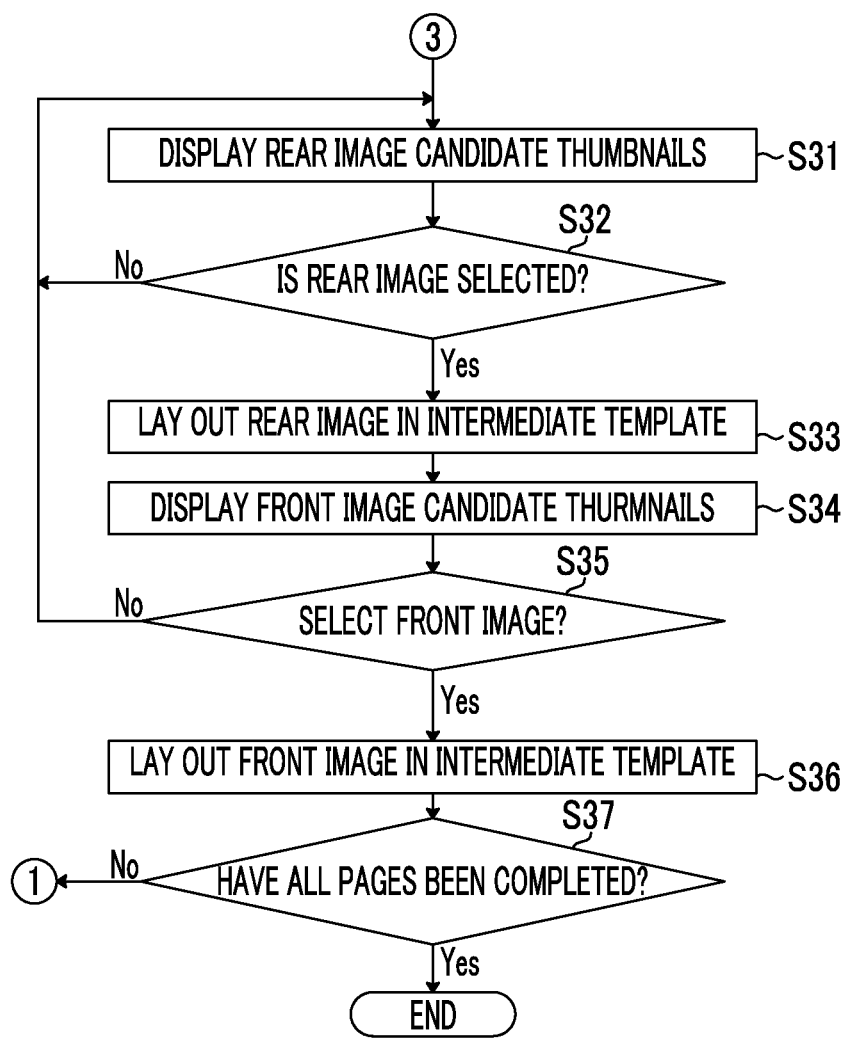
FIG. 4 is a flowchart of process of arranging an intermediate template.

FIGS. 2 to 4 illustrate a flowchart of a photo book creation process that is an embodiment of the rear image candidate determination method of the present invention. The photo book creation process includes a first rear image template layout process (see FIG. 2), a second rear image template layout process (see FIG. 3), and an intermediate template layout process (see FIG. 4). A rear image candidate determination program for causing a processor of the rear image candidate determination device 1 to execute such a process is stored in a computer-readable non-transitory tangible medium, such as a flash memory.

A first rear image template layout process will be described with reference to FIG. 2.

In S0, the image reception unit 11 receives a plurality of images.

In S1, the theme setting unit 33 sets a theme of the photo book. The theme setting unit 33 sets a theme corresponding to the plurality of images which are received in S0. The theme setting unit 33 sets the theme of the photo book from "marriage", "travel", and "children" according to a user input or according to a result of the image analysis for the plurality of images. The image analysis can be performed through image annotation. The theme of the "marriage" is set in a case where the bride and groom have been detected from the subject, the theme of the "travel" is set in a case where the landscape has been detected, and the theme of the "children" is set in a case where children are detected.

In S2, the image grouping unit 32 groups the plurality of images in an order of imaging date and time according to supplementary information for the plurality of images, and performs numbering on the image group obtained by the grouping according to the imaging date and time in an order from old imaging date and time to recent imaging date and time. For example, the image grouping unit 32 performs grouping and numbering by grouping a group of images captured during 10:00-11:00 AM into group 1, a group of images captured during 11:00-12:00 AM into group 2, a group of images captured during 0:00-1:00 PM into group 3, and a group of images captured during 1:00-2:00 PM into group 4. Hereinafter, the number of the group at the oldest imaging date and time is set to 1, and the number of the group at the latest imaging date and time is set to n (n is an integer equal to or greater than 1).

In S3, the first object determination unit 12 determines whether or not each of images included in a group k (k is an integer equal to or greater than 1 and equal to or smaller than n) includes the first object corresponding to the theme set in S1. If at least one of the image candidates in the group k includes the first object corresponding to the theme, the process proceeds to step S10, and if any one of the image candidates in the group k does not include the first object corresponding to the theme, the process proceeds to step S4 (see FIG. 3).

In S10, the first evaluation value calculation unit 13 calculates a first evaluation value for the first object determination image that is an image including the first object.

In S11, the first evaluation criterion storage unit 14 stores the first evaluation criterion, that is, a threshold value of at least one of a degree of blurriness, shake, or brightness of the first object determination image. However, a timing at which the first evaluation criterion storage unit 14 stores the first evaluation criterion may be any time before the next process of S12 starts and such a process may not be necessarily performed as one process in the first rear image template layout process.

In S12, the first rear image candidate determination unit 15 determines a first rear image candidate from among the first object determination images on the basis of the first evaluation value calculated by the first evaluation value calculation unit 13 and the first evaluation criterion stored in the first evaluation criterion storage unit 14. For example, the first rear image candidate determination unit 15 determines the first object determination image (which may be one or a plurality of object determination images) in which a first evaluation value equal to or greater than the first evaluation criterion has been calculated, to be the first rear image candidate. In a case where there is no first evaluation value equal to or greater than the first evaluation criterion, the process may return to S11 to decrease the first evaluation criterion and determine the first rear image candidate again.

In S13, the display unit 21 displays a list of thumbnail images of the first rear image candidates determined in S12.

In S14, the first rear image candidate layout unit 16 receives a selection of an arbitrary thumbnail image from among the thumbnail images of the first rear image candidates through a user operation. In a case where the thumbnail image of the first rear image candidate is selected, the process proceeds to S15.

In S15, the first rear image candidate layout unit 16 lays out the first rear image that is the first rear image candidate corresponding to the selected thumbnail image, in a frame corresponding to the rear image layout region of the first rear image template. In a case where there is only one first rear image candidate, the first rear image candidate layout unit 16 may lay out the first rear image candidate in the rear image region of the first rear image template.

Figure 5:
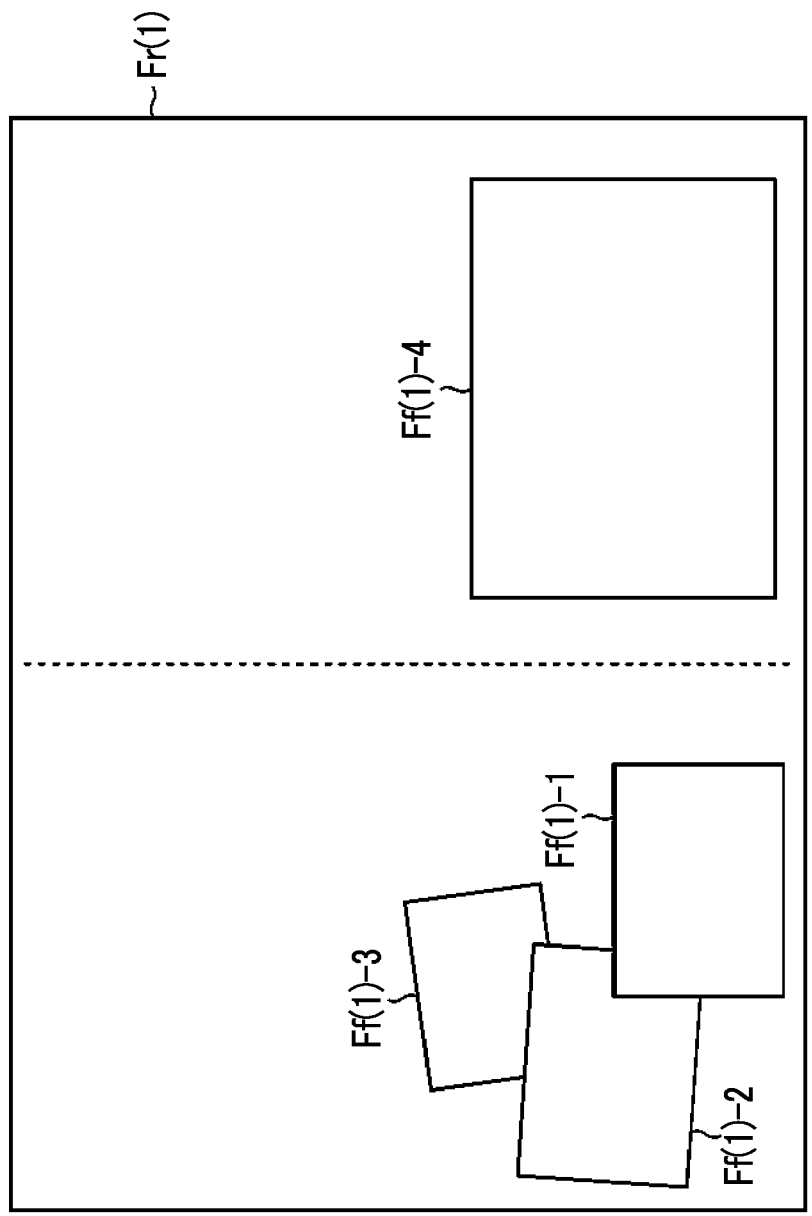
FIG. 5 is a diagram illustrating an example of a first rear image template.

Here, the first rear image template as illustrated in FIG. 5 is a template in which occupying area of the frame Fr(1) of the first rear image is larger than occupying areas of frames Ff(1)-1, Ff(1)-2, Ff(1)-3, and Ff(1)-4 of the front images. The first rear image template corresponds to the k-th page of the template of the theme set in S1. Among the priorities of the frames Ff (1) -1, Ff (1) -2, and Ff (1) -3 of the overlapping front image, a priority of frame Ff(1)-1 is highest, a priority of frame Ff(1)-2 is second highest, and a priority of frame Ff(1)-3 is lowest.

In S16, the display unit 21 displays a list of thumbnail images of the front image candidates that are the image other than the first rear images belonging to the group k.

In S17, the front image selection unit 24 receives a selection of an arbitrary thumbnail image from among the thumbnail images of the front image candidates through a user operation. In a case where the thumbnail image of the front image candidate is selected, the process proceeds to S18. The number of selectable thumbnail images is equal to or greater than the number of frames of the front image in the first rear image template. For example, in the case of the template of FIG. 5, thumbnail images of four or more front image candidates can be selected. All of the thumbnail images of the front image candidates may be selected by default, and it is not necessary to narrow down the front image candidates up to the number of the front image frames through a user operation.

In S18, the person image determination unit 17 determines whether or not each of the front image candidates corresponding to the selected thumbnail is a person image including a person. Further, the landscape image determination unit 18 determines whether or not each of the front image candidates corresponding to the selected thumbnails is the landscape image including a landscape.

The first front image layout unit 20 lays out the person image and the landscape image in a frame corresponding to the front image layout region of the first rear image template according to the ratio of the number of layouts of the person image and the landscape image corresponding to the theme set by the theme setting unit 33. The ratio of the number of layouts of the person image and the landscape image corresponding to the theme set by the theme setting unit 33 is stored in the person-landscape ratio storage unit 19. The combination unit 34 combines the rear image and the front image laid out in the frames of the first rear image template to create a combined image. The display unit 21 displays the combined image.

In S19, the first object determination unit 12 determines whether or not images have been laid out in all frames of the first rear image template of the first to n-th page on the basis of images in groups 1 to n. In the case of Yes, the process ends, and in the case of No, S3 and the subsequent process are performed on the page in which images are not laid out or a page in which a user desires to lay out images again.

Next, a second rear image template layout process will be described with reference to FIG. 3.

In S4, the second object determination unit 26 determines whether or not each of the images included in group k includes the second object. If at least one of the image candidates in group k includes the second object, the process proceeds to S31 (see FIG. 4), and if all of the images in group k do not include the second object, the process proceeds to S20.

In S20, the second evaluation value calculation unit 28 calculates a second evaluation value that is an evaluation value of the second object determination image for the second object determination image.

In S21, the second evaluation criterion storage unit 29 stores the second evaluation criterion. However, a timing at which the second evaluation criterion storage unit 29 stores the second evaluation criterion may be any time before the next process of S22 starts and such a process may not be necessarily performed as one process in the second rear image template layout process.

In S22, the second rear image candidate determination unit 27 determines second rear image candidates from among the second object determination images on the basis of the second evaluation value calculated by the second evaluation value calculation unit 28 and the second evaluation criterion stored in the second evaluation criterion storage unit 29.

In S23, the display unit 21 displays a list of thumbnail images of the second rear image candidates determined in S22.

In S24, the second rear image candidate layout unit 30 receives a selection of an arbitrary thumbnail image from among the thumbnail images of the second rear image candidates through a user operation. In a case where the thumbnail image of the second rear image candidate is selected, the process proceeds to S25.

In S25, the second rear image candidate layout unit 30 lays out the second rear image that is the second rear image candidate corresponding to the selected thumbnail image, in a frame corresponding to the rear image layout region of the second rear image template. In a case where there is only one second rear image candidate, the second rear image candidate layout unit 30 may lay out the second rear image candidate in the rear image region of the second rear image template.

Figure 6:
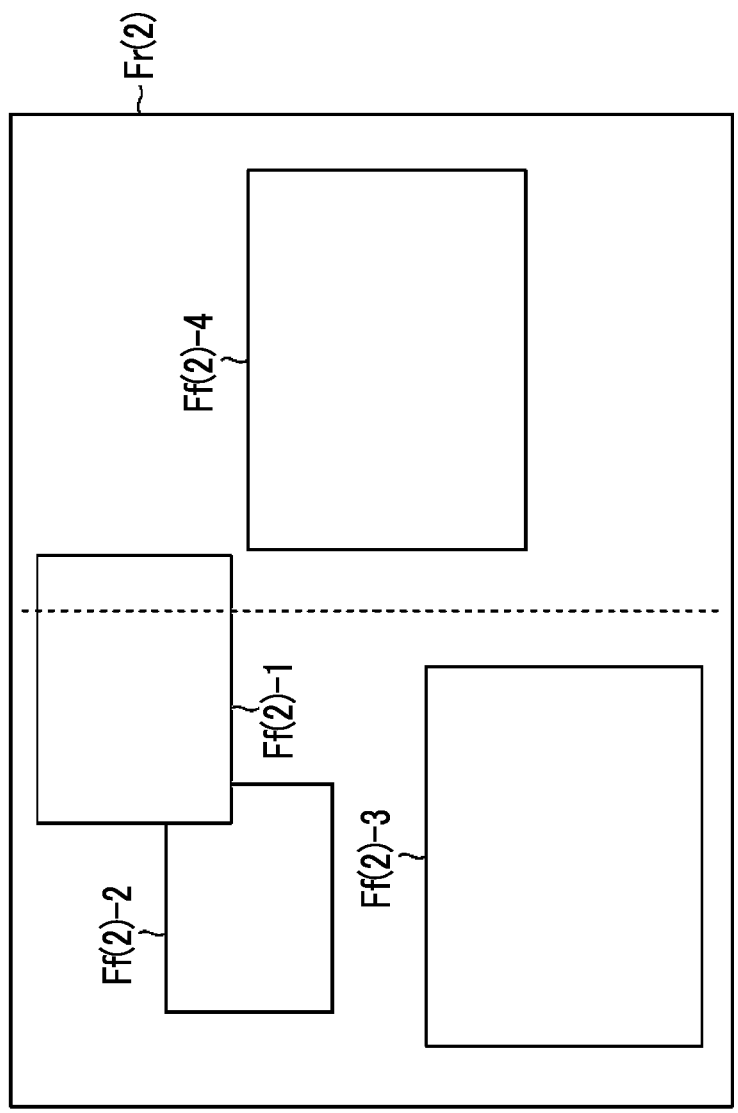
FIG. 6 is a diagram illustrating an example of a second rear image template.

Here, the second rear image template as illustrated in FIG. 6 is a template in which occupying areas of the frame Fr(2) of the rear image is smaller than occupying area of frames Ff(2)-1, Ff(2)-2, Ff(2)-3, and Ff(2)-4 of the front images. The second rear image template corresponds to the k-th page of the template of the theme set in S2. Among the priorities of the frames Ff(2)-1 and Ff(2)-2 of the overlapping front image, a priority of frame Ff(2)-1 is higher than a priority of frame Ff(2)-2.

In S26, the display unit 21 displays a list of thumbnail images of the front image candidates that are images other than the second rear image belonging to the group k.

In S27, the second front image layout unit 31 receives a selection of an arbitrary thumbnail image from among the thumbnail images of the front image candidates through a user operation. In a case where the thumbnail image of the front image candidate is selected, the process proceeds to S28. The number of selectable thumbnail images is the same as the number of frames of the front image in the second rear image template.

In S28, the second front image layout unit 31 lays out the front image corresponding to the selected thumbnail image in a frame corresponding to the front image layout region of the second rear image template. The combination unit 34 combines the rear image and the front image laid out in the frames of the second rear image template to create a combined image.

In S29, the second object determination unit 26 determines whether or not images have been laid out in all frames of the second rear image template of the first to n-th page on the basis of images in groups 1 to n. In the case of Yes, the process ends, and in the case of No, S4 in FIG. 2 and the subsequent process are performed on the page in which images are not laid out or a page in which a user desires to lay out images again.

Next, an intermediate template layout process will be described with reference to FIG. 4.

In S31, the display unit 21 regards all the images other than the image determined to include the second object in S4 as the rear image candidates, and displays a list of thumbnail images of the rear image candidates.

In S32, the intermediate rear image candidate layout unit 35 receives a selection of an arbitrary thumbnail image from among the thumbnail images of the rear image candidates through a user operation. In a case where the thumbnail image of the rear image candidate is selected, the process proceeds to S33.

In S33, the intermediate rear image candidate layout unit 35 lays out the rear image corresponding to the selected thumbnail image, in a frame corresponding to the rear image layout region of the intermediate template. In a case where there is only one rear image candidate, the intermediate rear image candidate layout unit 35 may lay out the second rear image candidate in the rear image region of the intermediate template.

Figure 7:
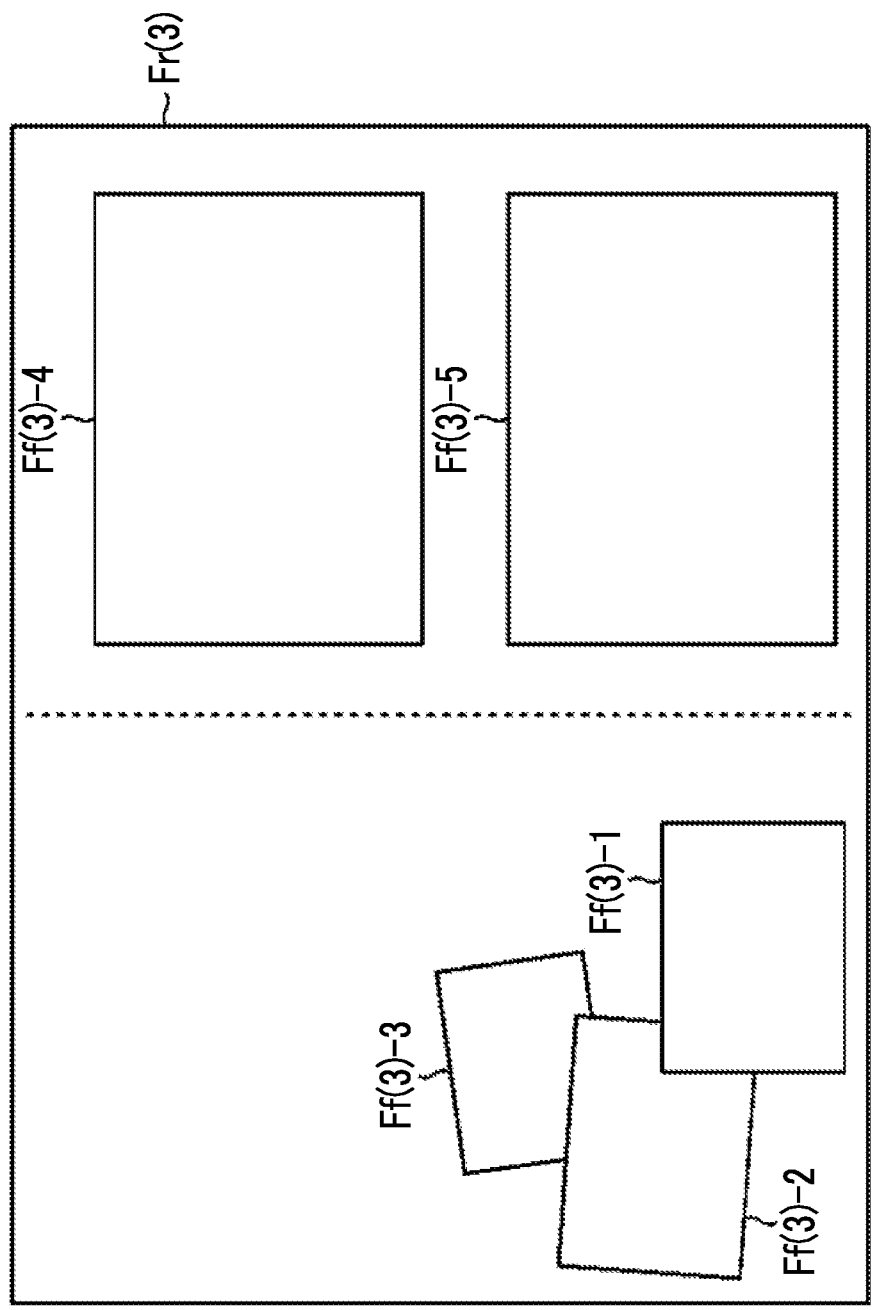
FIG. 7 is a diagram illustrating an example of an intermediate template.

Here, the intermediate template as illustrated in FIG. 7 is a template in which occupying areas of frames Ff(3)-1, Ff(3)-2, Ff(3)-3, Ff(3)-4, and Ff(3)-5 of the front images are the same as occupying area of the frame Fr(3) of the rear image. The intermediate template corresponds to the k-th page of the template of the theme set in S2. Among the priorities of the frames Ff(3)-1, Ff(3)-2, and Ff(3)-3 of the overlapping front image, a priority of frame Ff(3)-1 is highest, a priority of frame Ff(3)-2 is second highest, and a priority of frame Ff(3)-3 is lowest.

In S34, the display unit 21 displays a list of thumbnail images of the front image candidates that are images other than which are images other than the images regarded as the rear image candidate in S31 among the images belonging to the group k.

In S35, the intermediate front image candidate layout unit 36 receives a selection of an arbitrary thumbnail image from among the thumbnail images of the front image candidates through a user operation. In a case where the thumbnail image of the front image candidate is selected, the process proceeds to S36. The number of selectable thumbnail images is the same as the number of frames of the front image in the intermediate template.

In S36, the intermediate front image candidate layout unit 36 lays out the front image that is a front image candidate corresponding to the selected thumbnail image in a frame corresponding to the front image layout region of the intermediate template. The combination unit 34 combines the rear image and the front image laid out in the frames of the intermediate template to create a combined image.

In S37, the second object determination unit 26 determines whether or not images have been laid out in all frames of the intermediate template of the first to n-th page on the basis of images in groups 1 to n. In the case of Yes, the process ends, and in the case of No, S3 and the subsequent process in FIG. 2 are performed on the page in which images are not laid out or a page in which a user desires to lay out images again.

Figure 8:
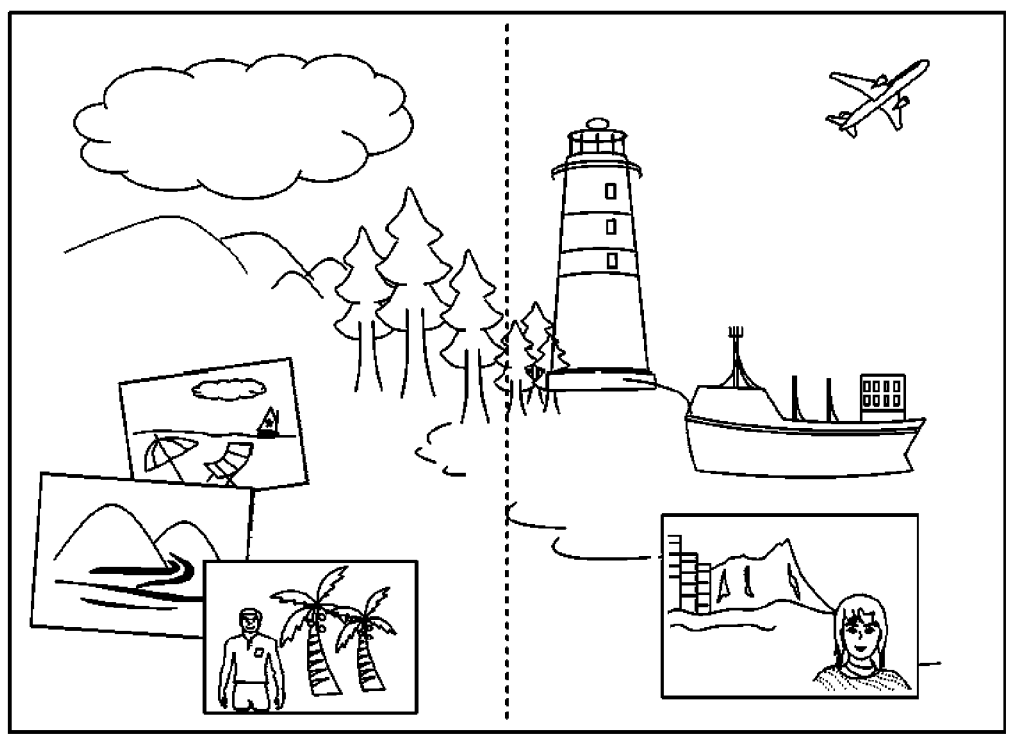
FIG. 8 is a display example of a combined image created through a first rear image template layout process.

FIG. 8 is a display example of the combined image created through the first rear image template layout process. Landscape images satisfying the first evaluation criteria are laid out in the rear image layout region. On the other hand, images including a person and images including a landscape are laid out by the same number (ratio 2:2) in the front image layout region. Thus, it is possible to automatically or semi-automatically create a photo album in which a beautiful landscape image satisfying the first evaluation criterion is created in a rear image.

Figure 9:
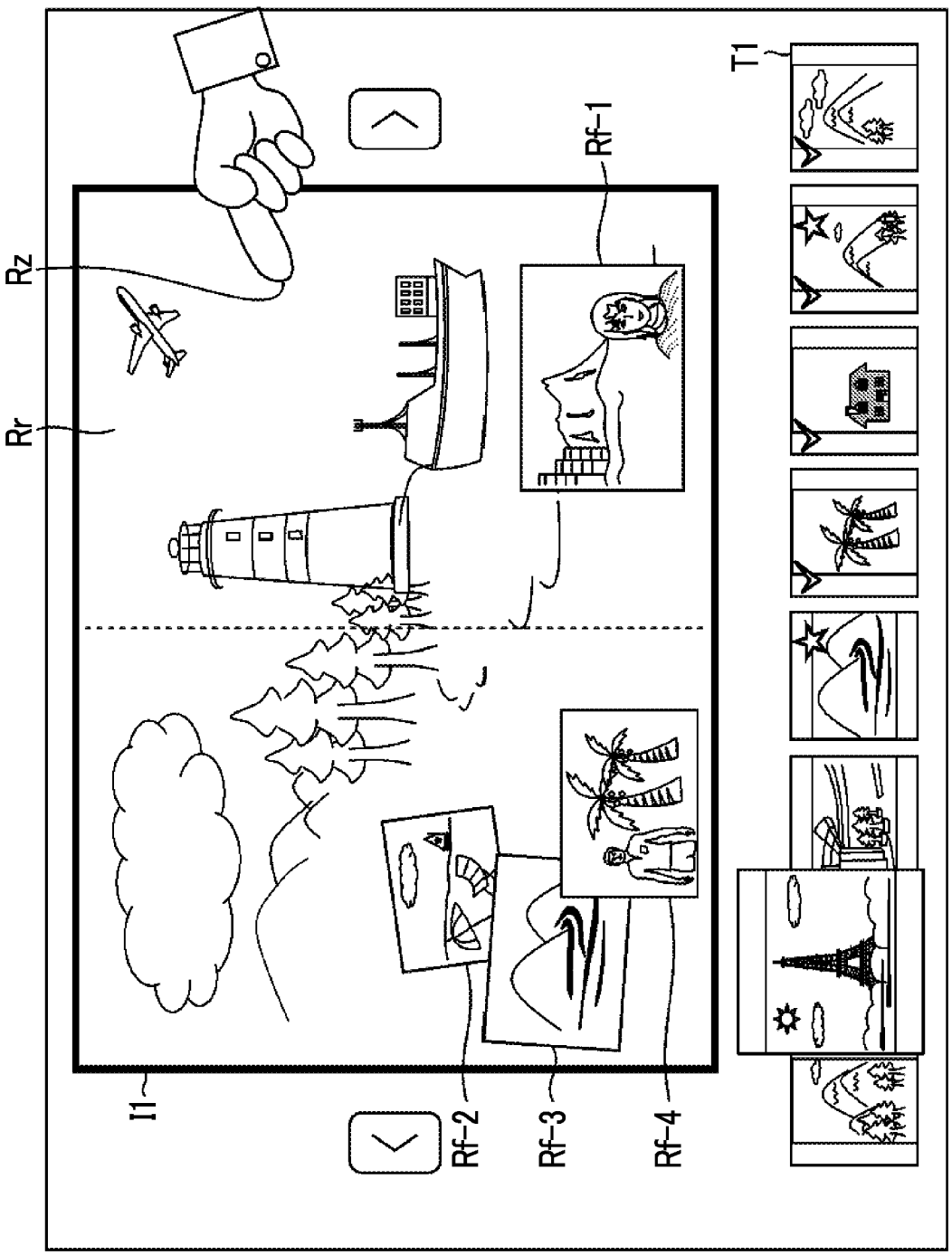
FIG. 9 illustrates an example of a display of a list of thumbnail images of a first rear image candidates and an example of a display of a combined image.

FIG. 9 illustrates an example of a display of a list of thumbnail images of the first rear image candidates and a display example of the combined images. In FIG. 9, a list of thumbnail images T1 of a group of images that have been grouped is displayed, and the thumbnail images of the first rear image candidates included in the image group are marked by icons having a predetermined shape such as a star. When a desired thumbnail image is selected from among the marked thumbnail images of the first rear image candidates, the selected thumbnail image is marked by a check mark or the like, and the first rear image corresponding to the thumbnail image is laid out in a frame of the first rear image layout region. In a case where the first rear image is selected again after creation of the combined image I1, the user can select an exclusion region Rz other than the front image layout regions Rf-1, Rf-2, Rf-3, and Rf-4 from the first rear image layout region Rr of the combined image I1 through touch of the touch panel, or the like.

The exclusion region selection unit 22 receives the selection of the exclusion region Rz by a user operation. By receiving the selection of the exclusion region Rz using the exclusion region selection unit 22, the thumbnail image T1 in the image group including the first rear image candidates is displayed, and the first rear image candidates can be reselected and laid out. The thumbnail images T1 of the first rear image candidates are displayed distinguishably from the combined image I1, the front image layout regions Rf-1, Rf-2, Rf-3, and Rf-4, and the exclusion region Rz, in a region such as a region under the combined image I1 in the same window as the combined image I1 or a region inside window separated from the combined image I1.

Figure 10:
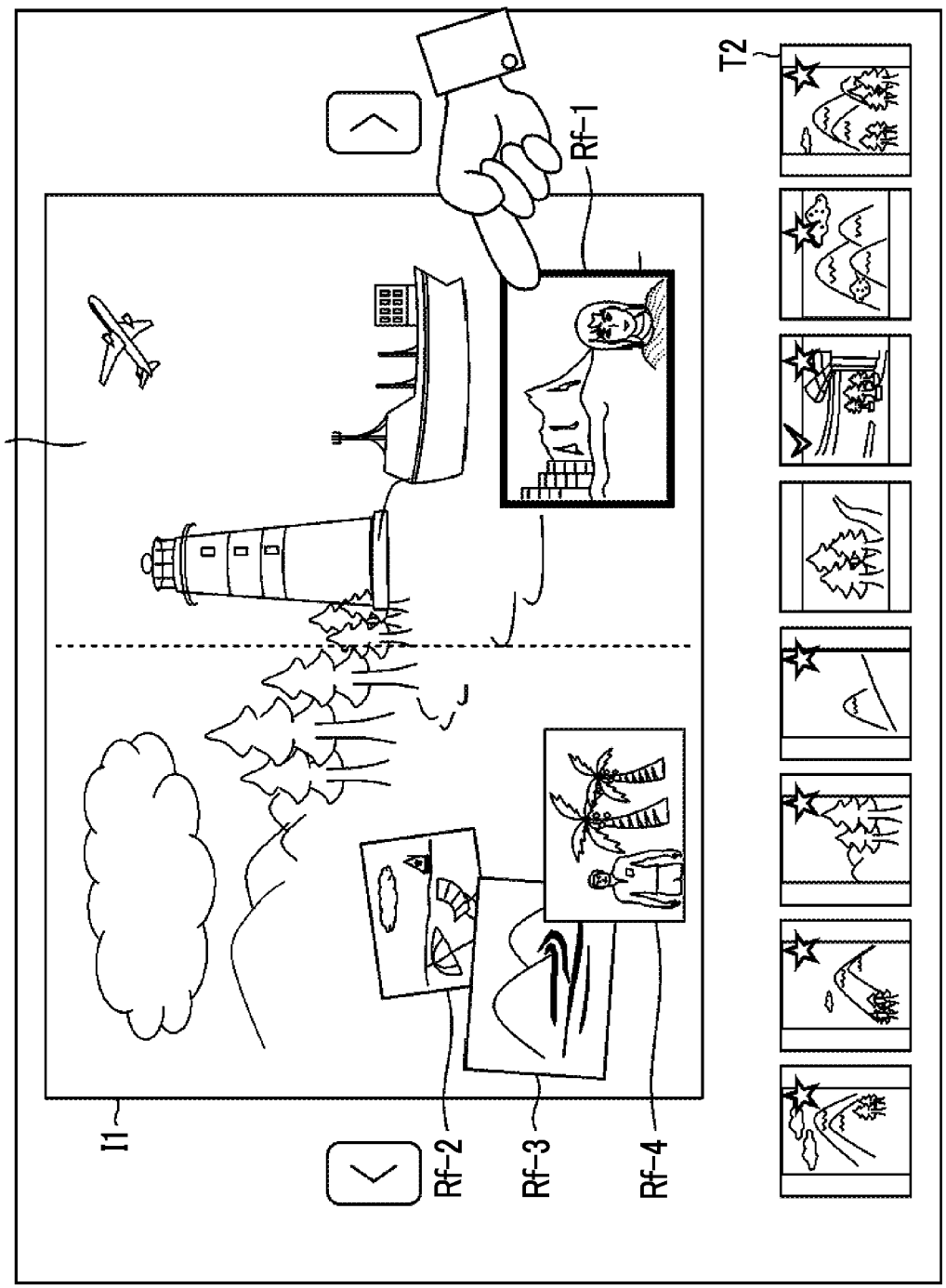
FIG. 10 illustrates an example of a display of a list of thumbnail images of front image candidates and an example of a display of a combined image.

FIG. 10 illustrates an example of a display of a list of thumbnail images of the front image candidates and a display example of the combined images. In FIG. 10, a list of thumbnail images T2 of a group of images that have been grouped is displayed, and the thumbnail images of the front image candidates included in the image group are marked by icons having a predetermined shape such as a star. When a desired thumbnail image is selected from among the marked thumbnail images of the front image candidates, the selected thumbnail image is marked by a check mark or the like, and the front image corresponding to the thumbnail image is laid out in a frame of the front image layout region. In a case where a front image is selected again after creation of the combined image I1, the user can select the front image layout region Rf-1, Rf-2, Rf-3, or Rf-4 via the front image layout region selection unit 23 including a touch panel or the like. By selecting the front image layout region via the front image layout region selection unit 23, the thumbnail image T2 in the image group including the front image candidates is displayed, and the front image candidates can be reselected and laid out. The thumbnail images of the front image candidates are displayed distinguishably from the combined image I1, the front image layout regions Rf-1, Rf-2, Rf-3, and Rf-4, and the exclusion region Rz, in a region such as a region under the combined image I1 in the same window as the combined image I1 or a region inside window separated from the combined image I1.

Figure 11:
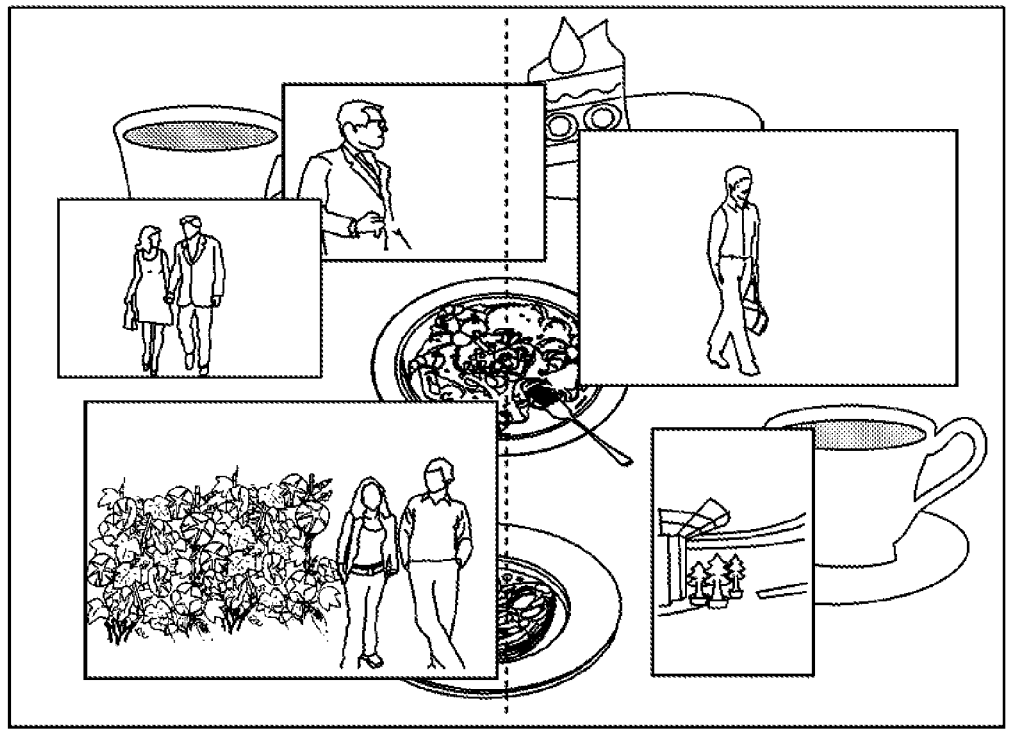
FIG. 11 illustrates an example of a display of a combined image created through a second rear image template layout process.

FIG. 11 is a display example of a combined image created through the second rear image template layout process. An image that includes neither a person nor a landscape is laid out in the rear image layout region. On the other hand, an arbitrarily selected image is laid out in the front image layout region. Thus, if there is an image which includes neither the first object nor the second object and which has image quality relatively suitable for the rear image, the rear image can be laid out in the rear image layout region and can be arranged so that the front image is conspicuous and the rear images is inconspicuous.

Figure 12:
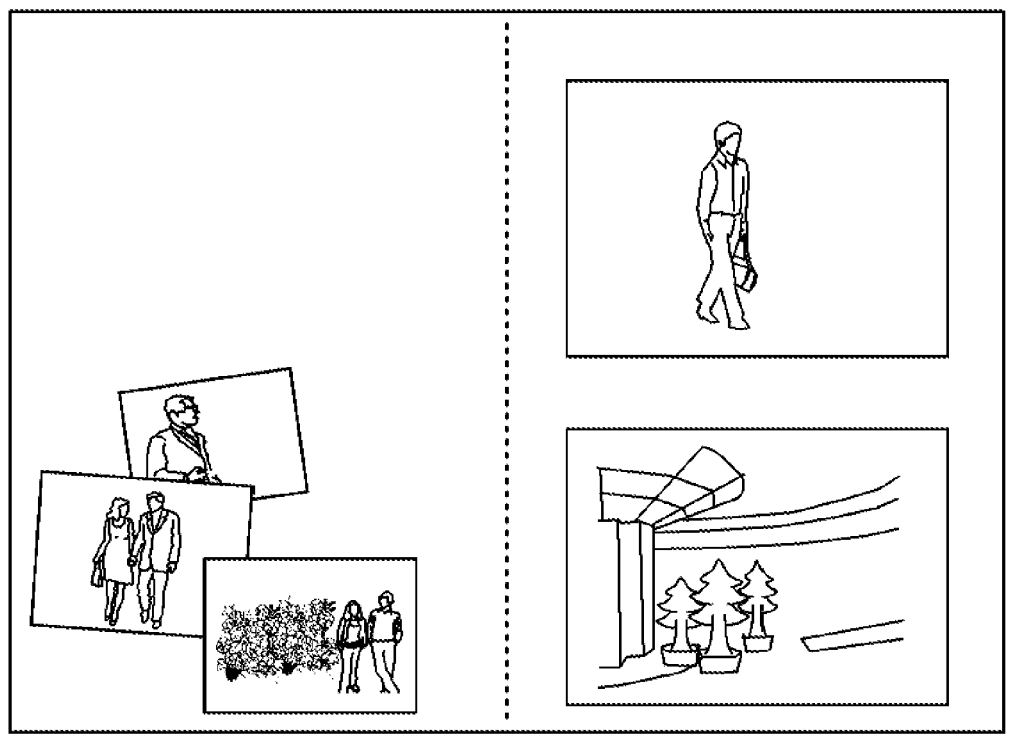
FIG. 12 illustrates an example of a display of a combined image created through an intermediate plate layout process.

FIG. 12 is a display example of the combined image created through the intermediate template layout process. Thus, in a case where there is no image suitable for a rear surface, it is possible to create a combined image in which both of the rear image and the front image appear with the same size in an arbitrary layout and an arbitrary image selected by the user.

<Second Embodiment>

In the first embodiment, in a case where the first object is included in the image group, the images are always laid out in the first rear image template. However, in a case where an arbitrary normal template is selected by the user, a process of laying out selected images in the selected template to create a combined image may be executed, and then, in a case where the first object is included in the image laid out in the combined image, a first rear image template layout process may be executed according to an arbitrary selection of the user.

Figure 13:
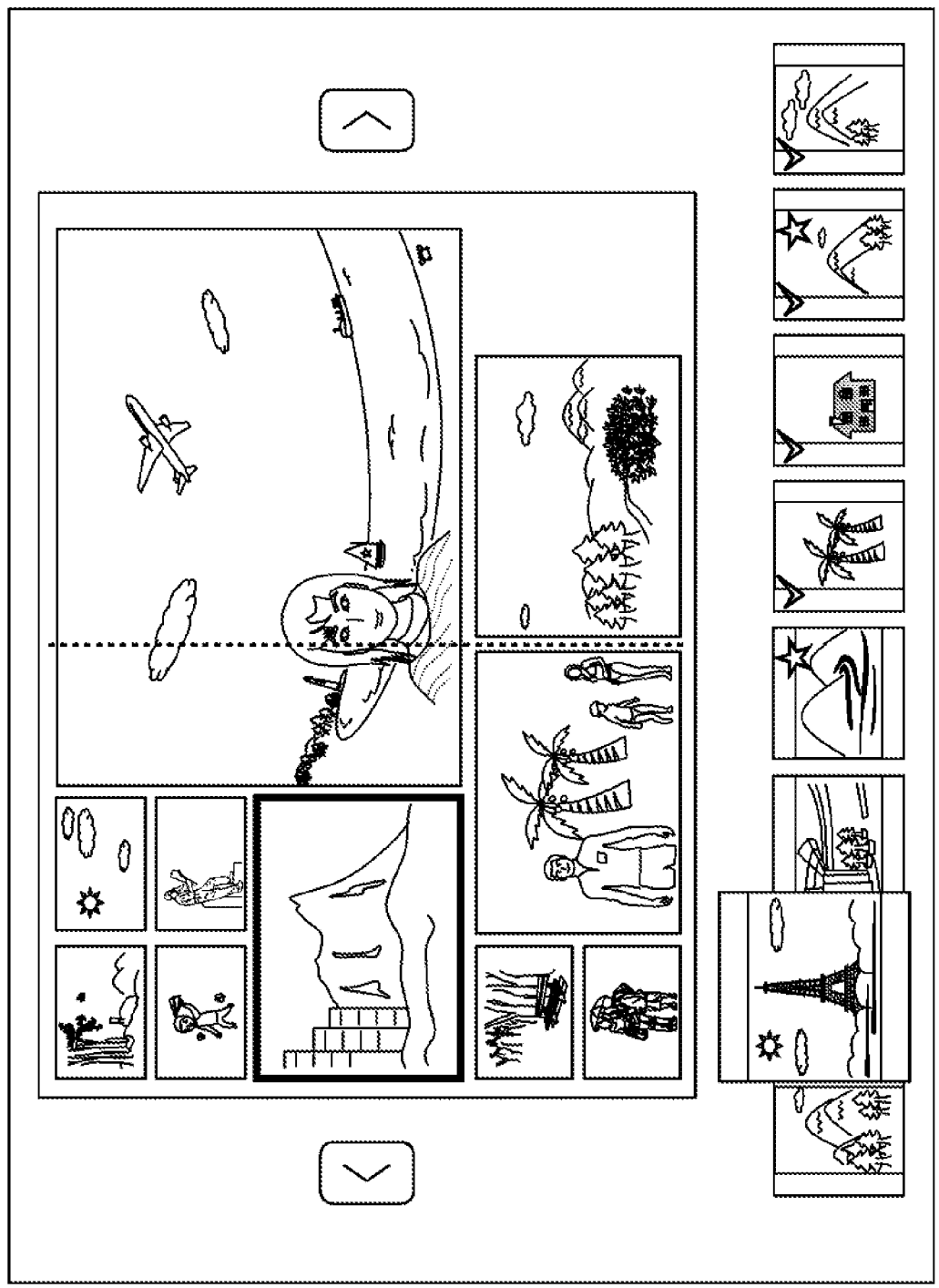
FIG. 13 illustrates an example of a display of a combined image in which a front image is laid out in an arbitrarily selected template.

Specifically, for example, as illustrated in FIG. 13, a combined image in which the front image is laid out in the selected template is created according to the user selecting an arbitrary template and an arbitrary front image, and this combined image is displayed on an edit screen. Although not illustrated, the rear image may be laid out in the rear image layout region of the selected template in a case where the rear image is selected.

Figure 14:
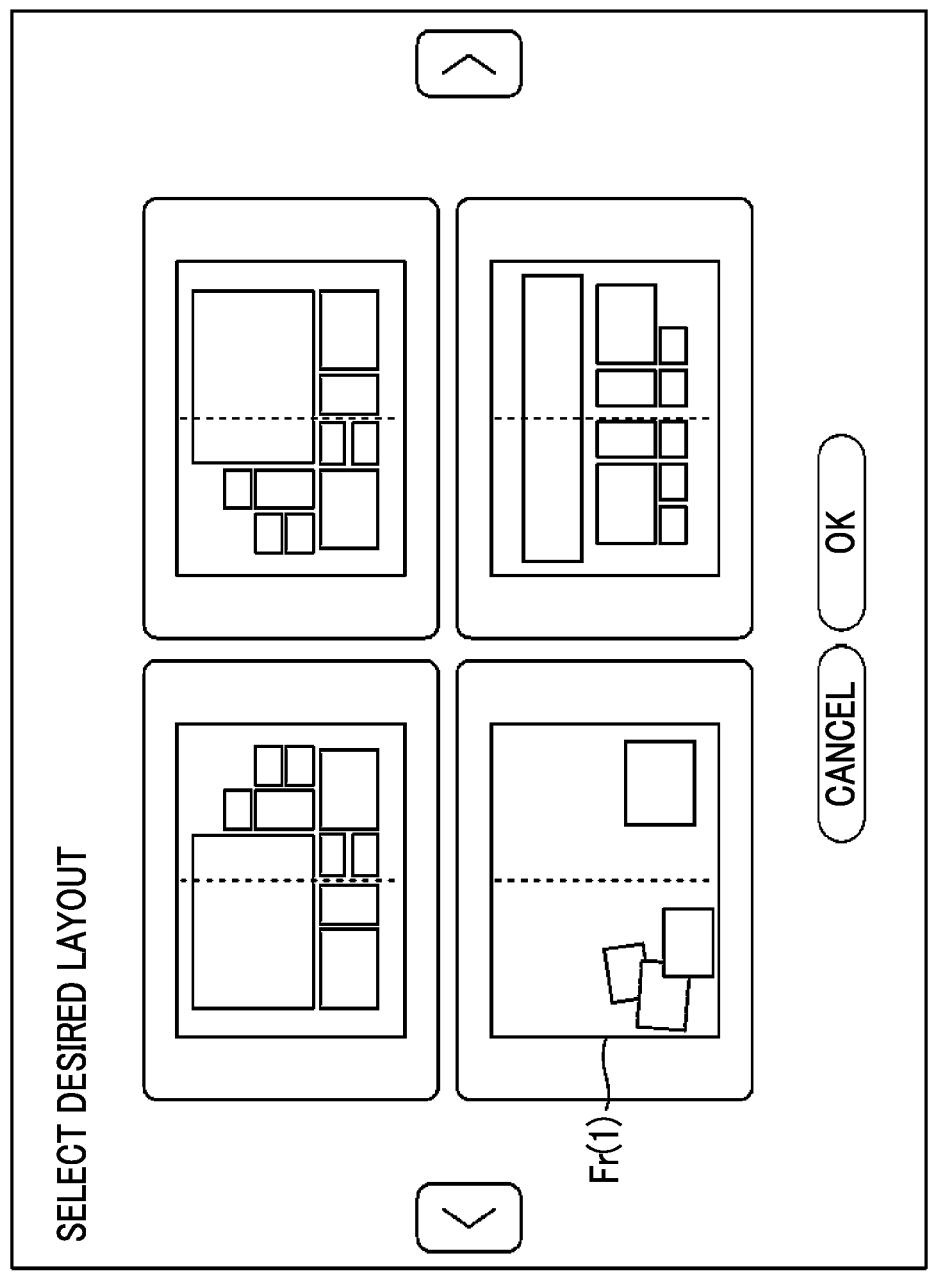
FIG. 14 illustrates an example of a display of a list of selectable templates.
Figure 15:
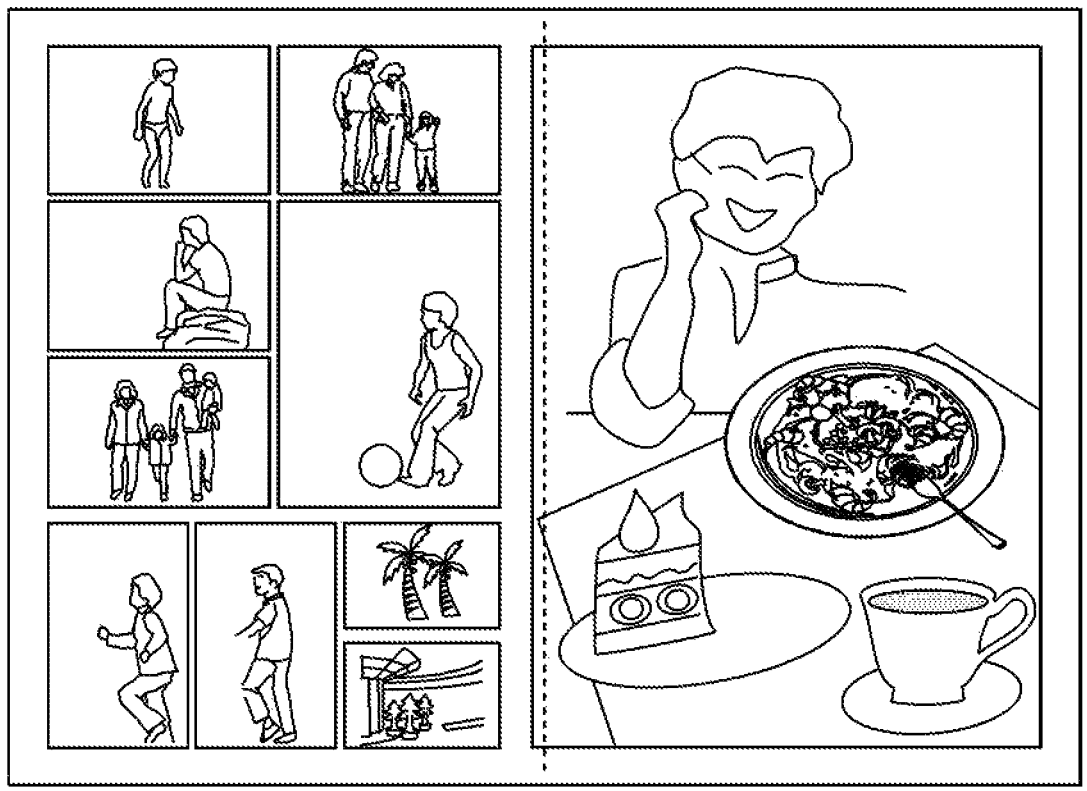
FIG. 15 illustrates an example of an arrangement in which respective frames are arranged without overlapping images in a photo book of the related art.
Figure 16:
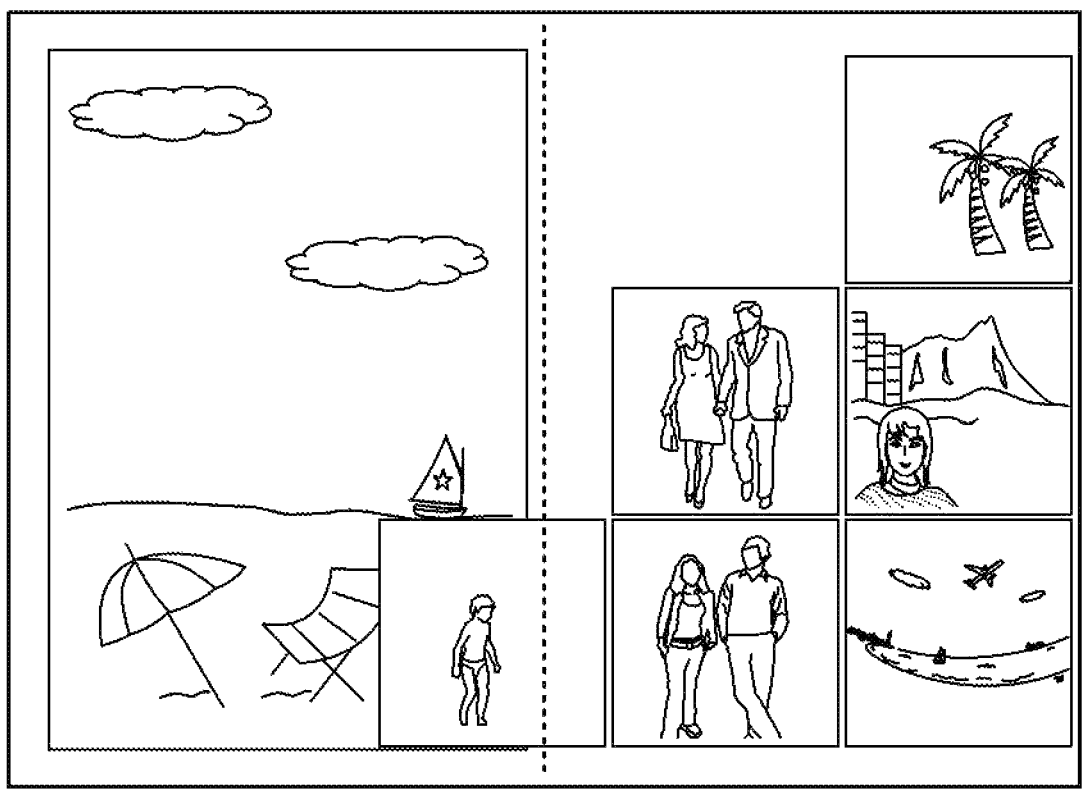
FIG. 16 illustrates an example of a layout in which images overlap in a photo book of the related art.
Figure 17:
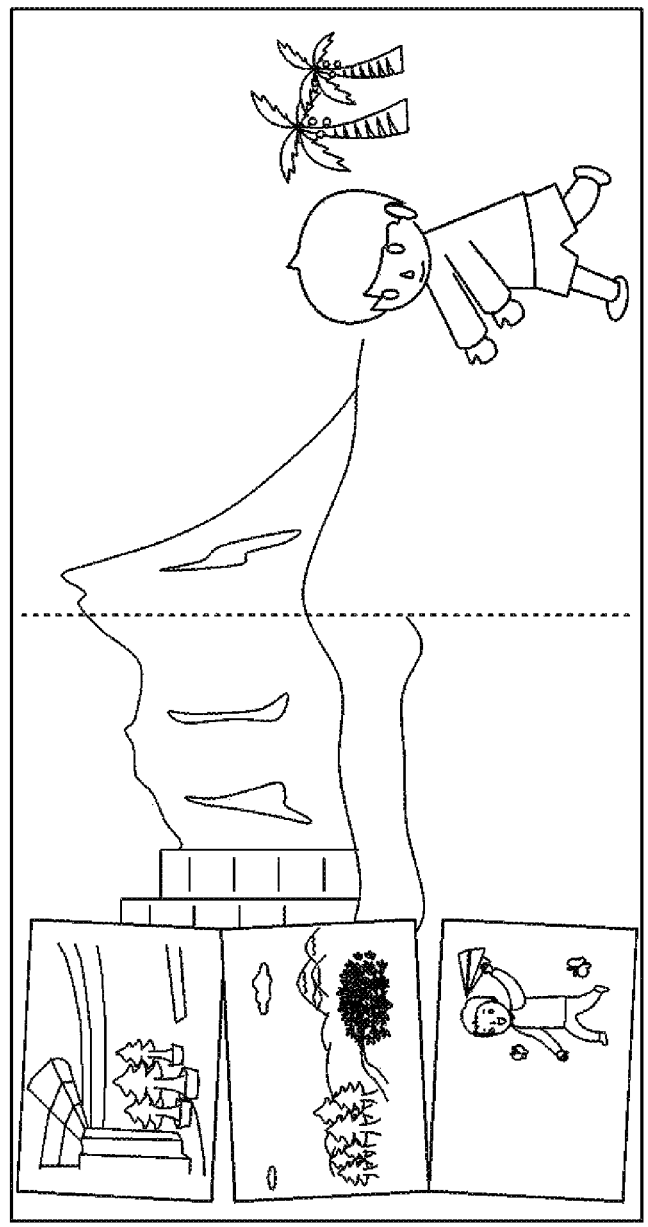
FIG. 17 illustrates another example of a layout in which images overlap in a photo book of the related art.
Figure 18:
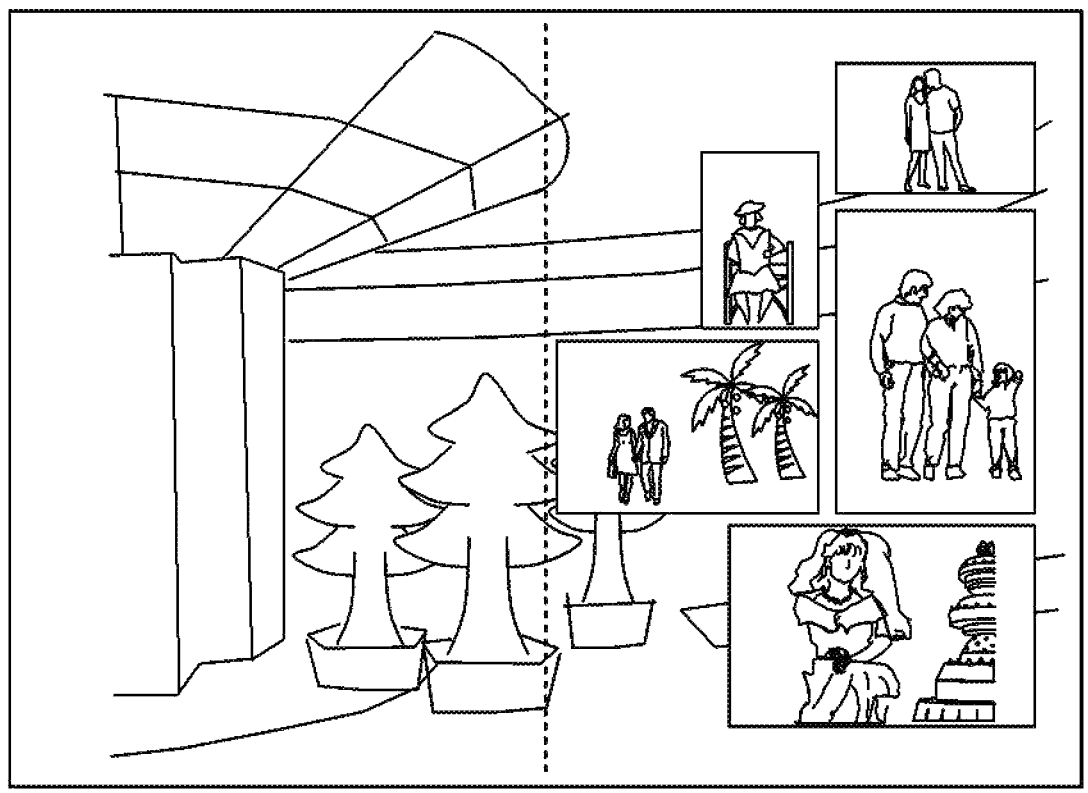
FIG. 18 illustrates an example of a selection of a rear image in a photo book of the related art.

In this case, the first object determination unit 12 determines whether or not each of the front images arranged in the combined image displayed on the edit screen includes the first object corresponding to the theme set in 51 in FIG. 2. In a case where at least one of the front images is determined to include the first object corresponding to the theme, the front image including the first object is highlighted such as displayed with a thick frame in the edit screen, as illustrated in FIG. 13. Further, in a case where there is the front image including the first object, the first rear image template may be displayed as a list of selectable templates. FIG. 14 is an example of a display of a list of selectable templates. Here, in a case where the first rear image template is selected by the user, the process proceeds to S10 in FIG. 2, and the first rear image candidate determination or the like is performed on the front image including the first object to create a combined image. That is, if there is a front image including the first object, that is, a front image suitable as a rear image among front images arbitrarily selected by the user, this front image can be determined to be a new first rear image candidate. The user may select an arbitrary first rear image candidate instead of selecting an arbitrary front image. The rear image candidate determination device in this embodiment includes an image selection unit that receives a selection of a desired image from among the plurality of images by the user. Further, the display unit 21 displays candidates of the first rear image template according to the image selection unit receiving the selection of the first rear image candidate.

Accordingly, a chance to induce a template change to the first rear image template in which a beautiful landscape image or the like not noticed by the user can be more beneficially utilized as a rear image and more effectively lay out the rear image, instead of laying out the beautiful landscape image or the like not noticed by the user in the template designated by the user, can be provided.

<Third Embodiment>

In the first embodiment, the image is laid out in the first rear image template, the second rear image template, or the intermediate template according to whether or not the first object is included in the image candidate or the second object is included in the image candidate.

On the other hand, it may be determined whether or not the rear image and the front image are laid out in any one of the first rear image template, the second rear image template, or the intermediate template, according to the object including the rear image candidates determined by the first rear image candidate determination unit 15 or the second rear image candidate determination unit 27, the image quality, and the object including the front image candidate optionally selected by the user via the front image selection unit 24.

For example, a program for performing the following template determination may be executed by the processor of the rear image candidate determination device 1.

In a case where the rear image candidate includes the first object and the first evaluation value of the rear image candidate exceeds the first evaluation criterion (image quality is very good) and the front image candidate does not include the second object, the first rear image template is determined to be a template in which images are laid out.

In a case where the rear image candidate includes the first object and the first evaluation value of the rear image candidate exceeds the first evaluation criterion (image quality is very good) and the front image candidate includes the second object, the intermediate template is determined to be a template in which images are laid out.

In a case where the rear image candidate includes the first object and the first evaluation value of the rear image candidate is equal to the first evaluation criterion (image quality is good), the second rear image template is determined to be a template in which images are laid out irrespective of whether or not the front image candidate includes the second object.

In a case where the rear image candidate does not include the first object, a template (normal template) having the layout arbitrarily selected by the user is determined to be a template in which images are laid out irrespective of whether or not the front image candidate includes the second object.

Thus, images are laid out in a template appropriately selected on the basis of content of both of the rear image candidates and the front image candidates rather than on the basis of only the rear image candidates as in the first embodiment.

EXPLANATION OF REFERENCES

1: rear image candidate determination device
11: image reception unit
12: first object determination unit
13: first evaluation value calculation unit
14: first evaluation criterion storage unit
15: first rear image candidate determination unit
16: first rear image candidate layout unit
17: person image determination unit
18: landscape image determination unit
19: person-landscape ratio storage unit
20: first front image layout unit
21: display unit
22: exclusion region selection unit
23: front image layout region selection unit
24: front image selection unit
25: first rear image template selection unit
26: second object determination unit
27: second rear image candidate determination unit
28: second evaluation value calculation unit
29: second evaluation criterion storage unit
30: second rear image candidate layout unit
31: second front image layout unit
32: image grouping unit
33: theme setting unit
34: combination unit
35: intermediate rear image candidate layout unit
36: intermediate front image candidate layout unit

What is claimed is:

1. A rear image candidate determination device, comprising:
   a processor configured to:
      receive a plurality of images;
      determine whether or not each of the plurality of images includes a first object, the first object is a subject for photography;

calculate, for a first object determination image that is an image determined to include the first object, a first evaluation value that is an evaluation value of the first object determination image;

store a first evaluation criterion for evaluating the first evaluation value;

determine first rear image candidates from among the first object determination images on the basis of the first evaluation value and the first evaluation criterion;

lay out the first rear image candidates in a rear image layout region of a first rear image template, the first rear image template including the rear image layout region in which the rear image is laid out, and in a front image layout region in which one or a plurality of the received plurality of images are laid out as front images;

determine whether or not each of the plurality of images is a person image including a person;

determine whether or not each of the plurality of images is a landscape image including a landscape;

store a ratio between the person image and the landscape image; and lay out the person image and the landscape image in the front image layout region of the first rear image template according to the ratio between the person image and the landscape image;

a user interface device configured to receive a selection of a desired image from among the plurality of images as a selected first rear image candidate; and a display that displays candidates of the first rear image template according to the user interface device receiving the selection of the first rear image candidate, and the display displays a combined image obtained by combining the selected first rear image candidate laid out in the rear image layout region in the first rear image template of which a selection is received by the user interface device, and the person image and the landscape image laid out in the front image layout region in the first rear image template of which the selection is received by the user interface device.

2. The rear image candidate determination device according to claim 1, wherein the processor is further configured to:

set a theme corresponding to the plurality of images, determine whether or not each of the plurality of images includes the first object corresponding to the theme.

3. The rear image candidate determination device according to claim 1, wherein the processor is further configured to determine whether or not each of the plurality of images includes the first object on the basis of hue, lightness, and saturation of each of the plurality of images.

4. The rear image candidate determination device according to claim 3, wherein the first object includes at least one of a mountain, the sea, or the sky, and wherein the processor is further configured to determine whether or not each of the plurality of images includes the first object on the basis of hue, lightness, and saturation of a partial region of an image corresponding to the at least one of the mountain, the sea, or the sky.

5. The rear image candidate determination device according to claim 3, wherein the first object includes only a wedding bride and groom, and wherein the processor is further configured to determine whether or not each of the plurality of images includes the first object on the basis of hue, lightness, and saturation of a partial region of an image corresponding to the wedding bride and groom.

6. The rear image candidate determination device according to claim 3, wherein the first object includes children with a smiling face, and wherein the processor is further configured to determine whether or not each of the plurality of images includes the first object on the basis of hue, lightness, and saturation of a partial region of an image corresponding to the children with a smiling face.

7. The rear image candidate determination device according to claim 1, wherein the first evaluation value is a value regarding image quality of the first object determination image, and the first evaluation criterion is a threshold value regarding image quality of the first object determination image.

8. The rear image candidate determination device according to claim 7, wherein the first evaluation value includes at least one of a degree of blurriness, shake, or brightness of the first object determination image, and the first evaluation criterion includes a threshold of at least one of a degree of blurriness, shake, or brightness of the first object determination image.

9. The rear image candidate determination device according to claim 1, wherein the display distinguishably displays the front image layout region, an exclusion region obtained by excluding the front image layout region in the rear image layout region, and a list display region for displaying a list of at least some of a plurality of images; and the user interface device is configured to receive a selection of the exclusion region, wherein the display displays, in the list display region, the first rear image candidates other than the first rear image candidates laid out in the rear image layout region among the images indicating the first rear image candidates according to the user interface device receiving a selection of the exclusion region.

10. The rear image candidate determination device according to claim 9, wherein the user interface device is further configured to receive a selection of the front image layout region, wherein the display displays at least some of the plurality of images in the list display region according to the user interface device receiving the selection of the front image layout region.

11. The rear image candidate determination device according to claim 1, wherein the processor is further configured to:

determine whether or not each of the plurality of images includes a second object; and determine second rear image candidates from second object determination images that are images determined not to include the second object.

12. The rear image candidate determination device according to claim 11, wherein the second object includes a person, and wherein the processor is further configured to determine whether or not each of the plurality of images includes the second object through person detection.

13. The rear image candidate determination device according to claim 11, wherein the processor is further configured to:
  calculate a second evaluation value that is an evaluation value of the second object determination image for the second object determination image;
  store a second evaluation criterion for evaluating the second evaluation value; and
  determine the second rear image candidates from among the second object determination images on the basis of the second evaluation value and the second evaluation criterion.

14. The rear image candidate determination device according to claim 13,
  wherein the second evaluation value is a value regarding image quality of the second object determination image, and
  the second evaluation criterion is a threshold value regarding the image quality of the second object determination image.

15. The rear image candidate determination device according to claim 11,
  wherein the processor is further configured to lay out the second rear image candidates in a rear image layout region of a second rear image template, the second rear image template including the rear image layout region in which the rear image is laid out as a background, and a front image layout region in which one or a plurality of front images are laid out as a foreground.

16. The rear image candidate determination device according to claim 15, wherein the processor is further configured to:
  determine whether or not a front image candidate that is an image determined to include the second object is a person front image including a person;
  determine whether or not a front image candidate that is an image determined to include the second object is a landscape front image including a landscape;
  store a ratio of a person front image and a landscape front image to be laid in the front image layout region of the second rear image template; and
  lay out the person front image and the landscape front image in the front image layout region of the second rear image template according to the ratio of the person front image and the landscape front image.

17. A rear image candidate determination method, comprising steps of:
  receiving a plurality of images;
  determining whether or not each of the plurality of images includes a first object, the first object is a subject for photography;
  calculating, for a first object determination image that is an image determined to include the first object, a first evaluation value that is an evaluation value of the first object determination image;
  storing a first evaluation criterion for evaluating the first evaluation value;
  determining first rear image candidates from among the first object determination images on the basis of the first evaluation value and the first evaluation criterion;
  laying out the first rear image candidates in a rear image layout region of a first rear image template, the first rear image template including the rear image layout region in which the rear image is laid out, and a front image layout region in which one or a plurality of the received plurality of images are laid out as front images;
  determining whether or not each of the plurality of images is a person image including a person;
  determining whether or not each of the plurality of images is a landscape image including a landscape;
  storing a ratio between the person image and the landscape image;
  laying out the person image and the landscape image in the front image layout region of the first rear image template according to the ratio between the person image and the landscape image;
  receiving a selection of a desired image from among the plurality of images as a selected first rear image candidate;
  displaying candidates of the first rear image template according to the user interface device receiving the selection of the first rear image candidate; and
  displaying a combined image obtained by combining the selected first rear image candidate laid out in the rear image layout region in the first rear image template of which a selection is received by the user interface device, and the person image and the landscape image laid out in the front image layout region in the first rear image template of which the selection is received by the user interface device.

18. A non-transitory computer readable recording medium storing a rear image candidate determination program for causing a computer to execute the rear image candidate determination method according to claim 17.

* * * * *